(12) United States Patent
Lu et al.

(10) Patent No.: US 9,802,542 B2
(45) Date of Patent: Oct. 31, 2017

(54) TRAILER ANGLE DETECTION SYSTEM CALIBRATION

(71) Applicant: MAGNA ELECTRONICS INC., Auburn Hills, MI (US)

(72) Inventors: Yuesheng Lu, Farmington Hills, MI (US); Steven V. Byrne, Goodrich, MI (US); Paul A. VanOphem, Washington, MI (US); James D. Harris, Clarkston, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/268,941

(22) Filed: Sep. 19, 2016

(65) Prior Publication Data
US 2017/0001566 A1  Jan. 5, 2017

Related U.S. Application Data

(63) Continuation of application No. 14/036,723, filed on Sep. 25, 2013, now Pat. No. 9,446,713.
(Continued)

(51) Int. Cl.
*B60R 1/00* (2006.01)

(52) U.S. Cl.
CPC ............... *B60R 1/002* (2013.01); *B60R 1/00* (2013.01); *B60R 2300/105* (2013.01);
(Continued)

(58) Field of Classification Search
CPC ..... B60R 1/00; B60R 1/002; B60R 2300/105; B60R 2300/307; B60R 2300/607; B60R 2300/80
(Continued)

(56) References Cited

U.S. PATENT DOCUMENTS

| 4,200,361 A | 4/1980 | Malvano |
| 4,214,266 A | 7/1980 | Myers |

(Continued)

FOREIGN PATENT DOCUMENTS

| JP | 59114139 | 7/1984 |
| JP | 6080953 | 5/1985 |

(Continued)

OTHER PUBLICATIONS

Valkovic et al, Container inspection utilizing 14 MeV Neutrons, Jun. 2016.*
(Continued)

*Primary Examiner* — Shan Elahi
(74) *Attorney, Agent, or Firm* — Gardner, Linn, Burkhart & Flory, LLP

(57) ABSTRACT

A dynamic calibration method for calibrating a trailer angle detection system of a vehicle towing a trailer includes providing cameras configured to be disposed at the vehicle so as to have respective fields of view. Image data captured by at least some of the cameras is processed as the vehicle is driven forwardly and towing the trailer. A location of a portion of the trailer is determined via processing of captured image data. Responsive at least in part to processing of captured image data, a plurality of trailer parameters and vehicle-trailer interface parameters are determined. The plurality of trailer parameters and vehicle-trailer interface parameters are determined while the vehicle is driven forwardly and towing the trailer. The trailer angle detection system of the vehicle is calibrated responsive to determination that the trailer portion is not where the system expects it to be when the vehicle is traveling straight forward.

21 Claims, 18 Drawing Sheets

Related U.S. Application Data

(60) Provisional application No. 61/868,843, filed on Aug. 22, 2013, provisional application No. 61/834,128, filed on Jun. 12, 2013, provisional application No. 61/758,537, filed on Jan. 30, 2013, provisional application No. 61/705,877, filed on Sep. 26, 2012.

(52) U.S. Cl.
CPC ... *B60R 2300/307* (2013.01); *B60R 2300/607* (2013.01); *B60R 2300/80* (2013.01)

(58) Field of Classification Search
USPC .......................................................... 348/148
See application file for complete search history.

(56) References Cited

U.S. PATENT DOCUMENTS

| | | |
|---|---|---|
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,855,822 A | 8/1989 | Narendra et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi et al. |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |

(56) References Cited

U.S. PATENT DOCUMENTS

| | | |
|---|---|---|
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,455,557 A | 10/1995 | Noll et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,517,419 A | 5/1996 | Lanckton et al. |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,764 A | 7/1997 | McCullough |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayer |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,861,814 A | 1/1999 | Clayton |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,009,336 A | 12/1999 | Harris et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,176,505 B1 | 1/2001 | Capik et al. |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,292,094 B1 | 9/2001 | Deng et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |

(56) References Cited

U.S. PATENT DOCUMENTS

| | | |
|---|---|---|
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,442,465 B2 | 8/2002 | Breed et al. |
| 6,477,464 B2 | 11/2002 | McCarthy et al. |
| 6,480,104 B1 | 11/2002 | Wall et al. |
| 6,483,429 B1 | 11/2002 | Yasui et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,559,761 B1 | 5/2003 | Miller et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,721,659 B2 | 4/2004 | Stopczynski |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,806,809 B2 | 10/2004 | Lee et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,959,970 B2 | 11/2005 | Tseng |
| 6,968,736 B2 | 11/2005 | Lynam |
| 6,975,775 B2 | 12/2005 | Rykowski et al. |
| 6,999,856 B2 | 2/2006 | Lee |
| 7,004,593 B2 | 2/2006 | Weller et al. |
| 7,004,606 B2 | 2/2006 | Schofield |
| 7,005,974 B2 | 2/2006 | McMahon et al. |
| 7,006,127 B2 | 2/2006 | Mizusawa et al. |
| 7,038,577 B2 | 5/2006 | Pawlicki et al. |
| 7,046,448 B2 | 5/2006 | Burgner |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,154,385 B2 | 12/2006 | Lee et al. |
| 7,158,015 B2 | 1/2007 | Rao et al. |
| 7,159,890 B2 | 1/2007 | Craig et al. |
| 7,167,796 B2 | 1/2007 | Taylor et al. |
| 7,195,381 B2 | 3/2007 | Lynam et al. |
| 7,202,776 B2 | 4/2007 | Breed |
| 7,224,324 B2 | 5/2007 | Quist et al. |
| 7,227,459 B2 | 6/2007 | Bos et al. |
| 7,227,611 B2 | 6/2007 | Hull et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,360,932 B2 | 4/2008 | Uken et al. |
| 7,370,983 B2 | 5/2008 | DeWind et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,459,664 B2 | 12/2008 | Schofield et al. |
| 7,463,137 B2 | 12/2008 | Wishart et al. |
| 7,483,058 B1 | 1/2009 | Frank et al. |
| 7,526,103 B2 | 4/2009 | Schofield et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,616,781 B2 | 11/2009 | Schofield et al. |
| 7,619,508 B2 | 11/2009 | Lynam et al. |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,690,737 B2 | 4/2010 | Lu |
| 7,720,580 B2 | 5/2010 | Higgins-Luthman |
| 7,792,329 B2 | 9/2010 | Schofield et al. |
| 7,843,451 B2 | 11/2010 | Lafon |
| 7,855,778 B2 | 12/2010 | Yung et al. |
| 7,859,565 B2 | 12/2010 | Schofield et al. |
| 7,881,496 B2 | 2/2011 | Camilleri |
| 7,904,222 B2 | 3/2011 | Lee |
| 7,914,187 B2 | 3/2011 | Higgins-Luthman et al. |
| 7,930,160 B1 | 4/2011 | Hosagrahara et al. |
| 8,010,252 B2 | 8/2011 | Getman et al. |
| 8,017,898 B2 | 9/2011 | Lu et al. |
| 8,038,166 B1 | 10/2011 | Piesinger |
| 8,063,752 B2 | 11/2011 | Oleg |
| 8,094,170 B2 | 1/2012 | Kato et al. |
| 8,095,310 B2 | 1/2012 | Taylor et al. |
| 8,098,142 B2 | 1/2012 | Schofield et al. |
| 8,164,628 B2 | 4/2012 | Stein et al. |
| 8,218,007 B2 | 7/2012 | Lee et al. |
| 8,224,031 B2 | 7/2012 | Saito |
| 8,260,518 B2 | 9/2012 | Englert et al. |
| 8,411,998 B2 | 4/2013 | Huggett et al. |
| 8,755,984 B2 | 6/2014 | Rupp et al. |

(56) References Cited

U.S. PATENT DOCUMENTS

| | | | |
|---|---|---|---|
| 8,890,670 B2* | 11/2014 | Brey | B60T 7/16 |
| | | | 340/431 |
| 8,909,426 B2 | 12/2014 | Rhode et al. | |
| 9,085,261 B2 | 7/2015 | Lu et al. | |
| 9,315,212 B1 | 4/2016 | Kyrtsos et al. | |
| 9,335,162 B2 | 5/2016 | Kyrtsos et al. | |
| 9,373,044 B2 | 6/2016 | Wallat et al. | |
| 9,374,562 B2 | 6/2016 | Trombley et al. | |
| 9,446,713 B2 | 9/2016 | Lu et al. | |
| 2001/0001563 A1 | 5/2001 | Tomaszewski | |
| 2002/0113873 A1 | 8/2002 | Williams | |
| 2002/0145662 A1 | 10/2002 | Mizusawa et al. | |
| 2002/0145663 A1 | 10/2002 | Mizusawa et al. | |
| 2002/0149673 A1 | 10/2002 | Hirama | |
| 2003/0133014 A1 | 7/2003 | Mendoza | |
| 2003/0137586 A1 | 7/2003 | Lewellen | |
| 2003/0160428 A1* | 8/2003 | Lindell | B60D 1/30 |
| | | | 280/432 |
| 2003/0222982 A1 | 12/2003 | Hamdan et al. | |
| 2004/0130441 A1 | 7/2004 | Lee et al. | |
| 2005/0074143 A1 | 4/2005 | Kawai | |
| 2005/0146607 A1* | 7/2005 | Linn | B60R 1/00 |
| | | | 348/148 |
| 2005/0219852 A1 | 10/2005 | Stam et al. | |
| 2005/0237385 A1 | 10/2005 | Kosaka et al. | |
| 2006/0018511 A1 | 1/2006 | Stam et al. | |
| 2006/0018512 A1 | 1/2006 | Stam et al. | |
| 2006/0050018 A1 | 3/2006 | Hutzel et al. | |
| 2006/0091813 A1 | 5/2006 | Stam et al. | |
| 2006/0098094 A1 | 5/2006 | Lott | |
| 2006/0103727 A1 | 5/2006 | Tseng | |
| 2006/0152351 A1 | 7/2006 | Daura Luna et al. | |
| 2006/0250501 A1 | 11/2006 | Wildmann et al. | |
| 2006/0261936 A1* | 11/2006 | Widmann | B60Q 9/008 |
| | | | 340/435 |
| 2007/0104476 A1 | 5/2007 | Yasutomi et al. | |
| 2007/0109406 A1 | 5/2007 | Schofield et al. | |
| 2007/0120657 A1 | 5/2007 | Schofield et al. | |
| 2007/0242339 A1 | 10/2007 | Bradley | |
| 2008/0147321 A1 | 6/2008 | Howard et al. | |
| 2008/0158357 A1 | 7/2008 | Connell et al. | |
| 2008/0181488 A1* | 7/2008 | Ishii | B60R 1/00 |
| | | | 382/154 |
| 2008/0192132 A1 | 8/2008 | Bechtel et al. | |
| 2008/0231701 A1 | 9/2008 | Greenwood et al. | |
| 2009/0002487 A1* | 1/2009 | Poulin | H04N 7/183 |
| | | | 348/118 |
| 2009/0005932 A1 | 1/2009 | Lee et al. | |
| 2009/0093928 A1* | 4/2009 | Getman | B60T 8/1755 |
| | | | 701/37 |
| 2009/0113509 A1 | 4/2009 | Tseng et al. | |
| 2009/0143967 A1 | 6/2009 | Lee et al. | |
| 2009/0160987 A1 | 6/2009 | Bechtel et al. | |
| 2009/0190015 A1 | 7/2009 | Bechtel et al. | |
| 2009/0256938 A1 | 10/2009 | Bechtel et al. | |
| 2010/0039721 A1* | 2/2010 | Lee | B60R 1/025 |
| | | | 359/843 |
| 2010/0097519 A1 | 4/2010 | Byrne et al. | |
| 2011/0050903 A1 | 3/2011 | Vorobiev | |
| 2012/0016555 A1* | 1/2012 | Ghneim | B62D 15/0275 |
| | | | 701/41 |
| 2012/0045112 A1 | 2/2012 | Lundblad et al. | |
| 2012/0200706 A1 | 8/2012 | Greenwood et al. | |
| 2012/0265416 A1 | 10/2012 | Lu et al. | |
| 2012/0271512 A1* | 10/2012 | Rupp | B62D 13/06 |
| | | | 701/41 |
| 2012/0287232 A1* | 11/2012 | Natroshvili | G06T 7/33 |
| | | | 348/36 |
| 2014/0085472 A1* | 3/2014 | Lu | B60R 1/002 |
| | | | 348/148 |
| 2014/0160276 A1 | 6/2014 | Pliefke et al. | |
| 2014/0200759 A1 | 7/2014 | Lu et al. | |
| 2014/0218506 A1 | 8/2014 | Trombley et al. | |
| 2015/0002670 A1 | 1/2015 | Bajpai | |
| 2016/0101810 A1* | 4/2016 | Xu | B62D 15/0285 |
| | | | 701/41 |

FOREIGN PATENT DOCUMENTS

| | | |
|---|---|---|
| JP | 6414700 | 1/1989 |
| JP | 4114587 | 4/1992 |
| JP | 05050883 | 3/1993 |
| JP | 6227318 | 8/1994 |
| JP | 0769125 | 3/1995 |
| JP | 07105496 | 4/1995 |
| JP | 2630604 | 7/1997 |
| JP | 2003-083742 | 3/2003 |
| WO | WO2011/014497 | 2/2011 |
| WO | WO2012/103193 | 8/2012 |

OTHER PUBLICATIONS

Caup et al, Video-based trailer detection and articulating estimation, Jun. 23-26, 2013.*

J. Borenstein et al., "Where am I? Sensors and Method for Mobile Robot Positioning", University of Michigan, Apr. 1996, pp. 2, 125-128.

Bow, Sing T., "Pattern Recognition and Image Preprocessing (Signal Processing and Communications)", CRC Press, Jan. 15, 2002, pp. 557-559.

Vlacic et al., (Eds), "Intelligent Vehicle Technologies, Theory and Applications", Society of Automotive Engineers Inc., edited by SAE International, 2001.

Van Leuven et al., "Real-Time Vehicle Tracking in Image Sequences", IEEE, US, vol. 3, May 21, 2001, pp. 2049-2054, XP010547308.

Van Leeuwen et al., "Requirements for Motion Estimation in Image Sequences for Traffic Applications", IEEE, US, vol. 1, May 24, 1999, pp. 145-150, XP010340272.

Van Leeuwen et al., "Motion Estimation with a Mobile Camera for Traffic Applications", IEEE, US, vol. 1, Oct. 3, 2000, pp. 58-63.

Van Leeuwen et al., "Motion Interpretation for In-Car Vision Systems", IEEE, US, vol. 1, Sep. 30, 2002, p. 135-140.

Pratt, "Digital Image Processing, Passage—ED.3", John Wiley & Sons, US, Jan. 1, 2001, pp. 657-659, XP002529771.

* cited by examiner

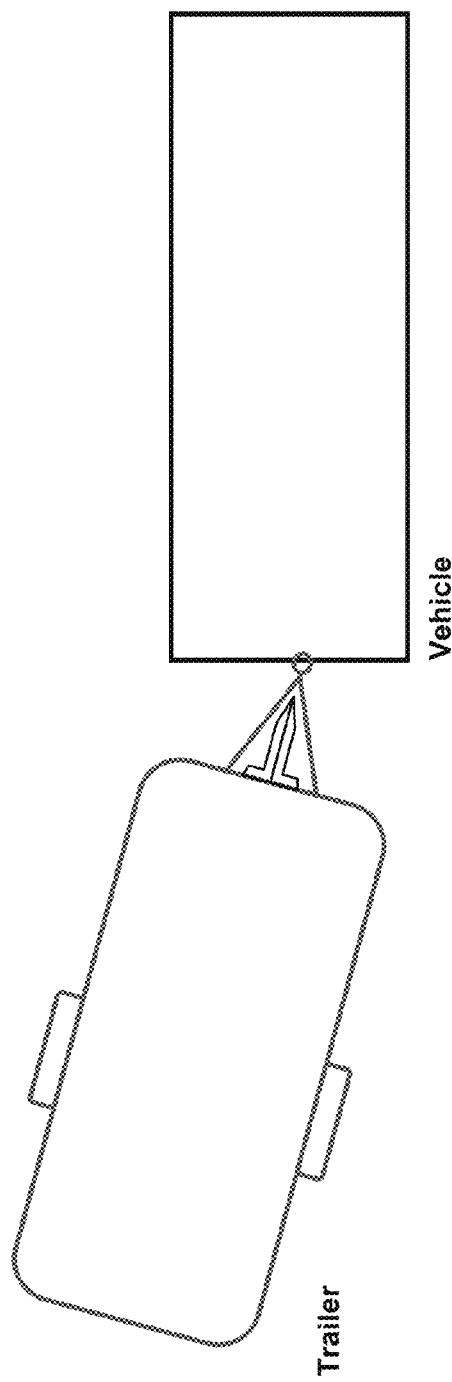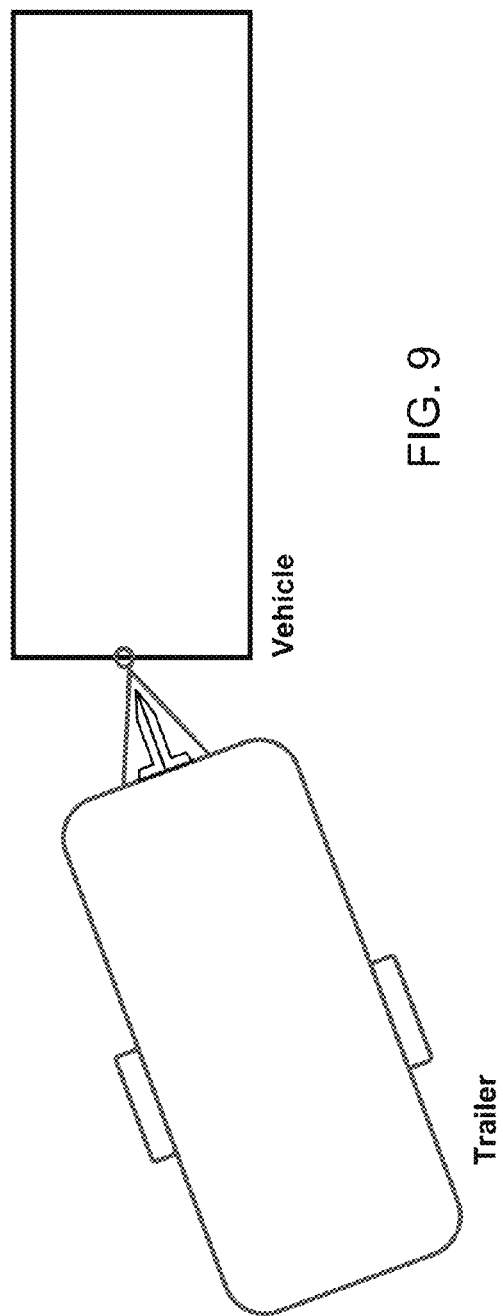

TRAILER ANGLE DETECTION SYSTEM CALIBRATION

CROSS REFERENCE TO RELATED APPLICATIONS

The present application is a continuation of U.S. patent application Ser. No. 14/036,723, filed Sep. 25, 2013, now U.S. Pat. No. 9,446,713, which claims the filing benefits of U.S. provisional applications, Ser. No. 61/868,843, filed Aug. 22, 2013; Ser. No. 61/834,128, filed Jun. 12, 2013; Ser. No. 61/758,537, filed Jan. 30, 2013; and Ser. No. 61/705,877, filed Sep. 26, 2012, which are hereby incorporated herein by reference in their entireties.

FIELD OF THE INVENTION

The present invention relates generally to rear vision systems for vehicles and, more particularly, to rear vision systems having a rearward facing camera at a rear portion of a vehicle.

BACKGROUND OF THE INVENTION

Rear backup cameras and vision systems are known for use in vehicles. Examples of such systems are described in U.S. Pat. Nos. 7,859,565; 6,611,202; 6,222,447; 5,949,331; 5,670,935 and/or 5,550,677, which are hereby incorporated herein by reference in their entireties. Such systems may display images for viewing by the driver of the vehicle that provide a view rearward of the vehicle.

SUMMARY OF THE INVENTION

The present invention provides a means for detecting the angle of a trailer being pulled behind a vehicle by using a rear view camera or multi-camera surround view system or the like. A camera is mounted at a rear end or rear portion of the pulling vehicle or on or in the center stop lamp or CHMSL of the vehicle, with the camera having a rearward field of view (such as a wide angle rearward field of view) rearward of the vehicle. A processor, such as a digital processor or FPGA or digital signal processor (DSP) or ASIC or camera imager SOC or other suitable processing means or the like, may process the images or image data (as captured by the rearward facing camera) of the trailer being pulled or towed by the vehicle and may determine the angle of the trailer in relation to the pulling vehicle in real time. Optionally, the control or system may, responsive to processing of the captured images, generate an alert to the driver of the vehicle and/or control or operate one or more accessories or systems of the trailer or vehicle (such as a brake system or steering system or display system or the like), such as in response to the determination of the angle of the trailer. The trailer angle detection system may utilize aspects of the systems described in PCT Application No. PCT/US2012/022517, filed Jan. 25, 2012 and published on Aug. 2, 2012 as International Publication No. WO 2012/103193, which is hereby incorporated herein by reference in its entirety.

The present invention provides a dynamic calibration method for calibrating the trailer angle detection system. Responsive to driving the vehicle towing a trailer around curves, the system calculates or determines various parameters relating to the trailer and the vehicle to calibrate the trailer angle detection system for the particular vehicle and trailer that is being towed. The calibration system or method of the present invention provides a dynamic calibration system that calibrates the vehicle's trailer angle detection system while the vehicle (towing the trailer) is being driven on a road and may obviate the need to manually measure various dimensions of the trailer and vehicle for initial calibration of the trailer angle detection system.

The present invention also provides a trailer angle detection system that includes at least one camera disposed at a vehicle and having an exterior field of view rearward of the vehicle. The camera is operable to capture image data. An image processor operable to process captured image data. The trailer includes a device or structure or element that is mounted at the trailer and is viewable by the camera. The trailer angle detection system is operable, responsive to image processing of captured image data, to determine a trailer angle of a trailer that is towed by the vehicle. The trailer angle detection system may be operable to display information for viewing by the driver to assist the driver in driving the vehicle with the trailer, and may display the predicted path that the trailer and vehicle are traveling along and/or the appropriate path to reverse the trailer to a selected location or parking area.

The present invention also provides a top-down or bird's eye or surround view display system that displays a top-down view of a vehicle and trailer to the driver of the vehicle to assist in maneuvering the vehicle with the trailer, such as to assist the driver in reversing the trailer, such as into a parking space or down a boat ramp or the like.

The system of the present invention may provide a simple top-down dynamic icon or iconistic view that depicts the vehicle-trailer system behavior in real-time and in a comprehensive manner. The depictions or displayed images may be superimposed over a portion of the mirror camera views so that the driver can see the needed view of the trailer as well as understand the effects of the selected steering wheel positions, such as during a reversing maneuver of the vehicle and trailer. Optionally, the present invention may provide a live top-down 360 degree view or bird's eye view that includes the vehicle and trailer. One or more cameras would be disposed at the trailer (such as at least at the rear of the trailer and preferably at each side of the trailer as well) and image processing would take the trailer position into account to maintain the stitched displayed image or scene. The dynamic icon may be superimposed over this displayed image or scene.

These and other objects, advantages, purposes and features of the present invention will become apparent upon review of the following specification in conjunction with the drawings.

BRIEF DESCRIPTION OF THE DRAWINGS

FIG. 8 is schematic of the vehicle and trailer of FIG. 6, showing the vehicle and trailer turning in one direction, with the relative angle of trailer and vehicle indicated by a larger amount of the left vertical section of the structure or element being exposed at the right side of the rear facing camera;

FIG. 9 is schematic of the vehicle and trailer of FIG. 8, showing the vehicle and trailer turning in the other direction, with the relative angle of trailer and vehicle indicated by a larger amount of the right vertical section of the structure or element being exposed at the left side of the rear facing camera;

DESCRIPTION OF THE PREFERRED EMBODIMENTS

Figure 1:
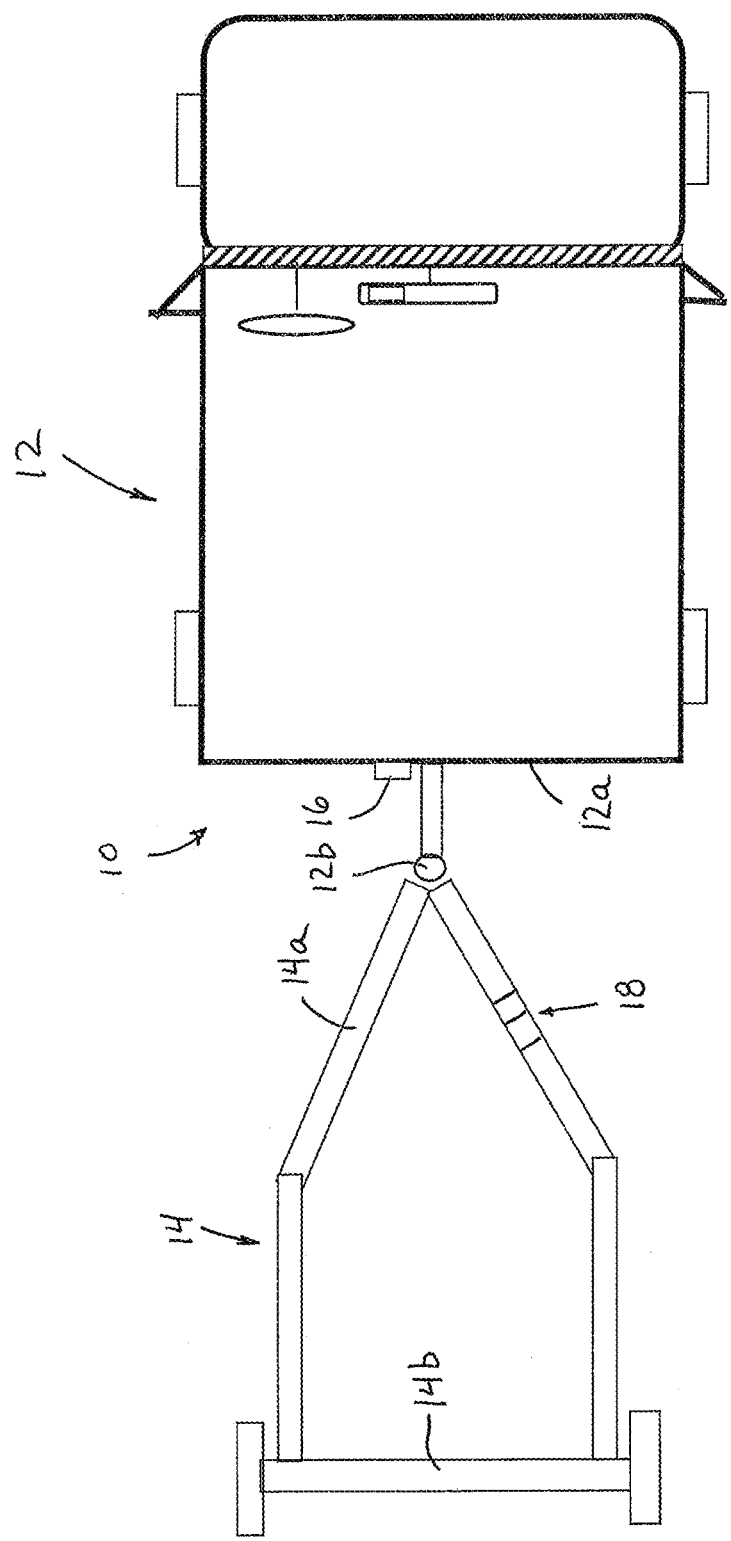
FIG. 1 is a plan view of a vehicle equipped with the rear vision system and trailer detection system of the present invention, shown towing a trailer.

Referring now to the drawings and the illustrative embodiments depicted therein, a rear vision system 10 for a vehicle 12 is operable to detect the angle of a trailer 14 that is pulled behind the vehicle 12 by using rear view camera or multi-camera surround view system. A camera 16 is mounted at the rear end portion of the pulling vehicle 12. An image processor (such as a digital processor or FPGA or DSP or ASIC or camera imager SOC or other suitable processor or processing means) is operable to process the images of the trailer and determines the angle of the trailer in relation to the pulling vehicle in real time, such as by utilizing aspects of the systems described in PCT Application No. PCT/US2012/022517, filed Jan. 25, 2012 and published on Aug. 2, 2012 as International Publication No. WO 2012/103193, which is hereby incorporated herein by reference in its entirety. The calibration system of the present invention is operable to calibrate the trailer angle detection (TAD) system as the vehicle is driven and turned, such as at corners or the like, along a road, as discussed below.

The rear vision system or trailer angle detection and viewing system of the present invention may utilize aspects of the trailer angle detection systems described in PCT Application No. PCT/US2012/022517, filed Jan. 25, 2012 and published on Aug. 2, 2012 as International Publication No. WO 2012/103193, and/or U.S. provisional applications, Ser. No. 61/840,542, filed Jun. 28, 2013; Ser. No. 61/823,648, filed May 15, 2013; and/or Ser. No. 61/736,104, filed Dec. 12, 2012, which are hereby incorporated herein by reference in their entireties.

The detection of the trailer angle relative to the vehicle is accomplished by detecting a portion of the trailer and determining the location of the detected portion relative to the towing vehicle, whereby the angle can be determined or calculated based on known geometries of the trailer and vehicle and the location of the camera on the vehicle. For example, the system may operate to track and determine a sideward movement of a trailer portion or target and, utilizing the known geometries, such as the distance of the trailer portion or target from the camera and/or the distance of the trailer portion or target from the pivot point or joint at which the trailer tongue attached to the trailer hitch of the vehicle, determine the angular movement of the trailer about the trailer hitch and relative to the vehicle, such as to determine a sway or swing of the trailer relative to the towing vehicle or to determine a rearward trajectory or path of travel of the trailer during a reversing maneuver of the vehicle and trailer, or the like.

As discussed in International Publication No. WO 2012/103193, incorporated above, the detection of the trailer portion or target can be achieved with an added target 18 on the trailer 14 or without an added target on the trailer (whereby the camera and processor may operate to detect a particular known or selected portion of the trailer). The target 18 may comprise any suitable shape or icon or indicia or the like. For example, the target may be in the shape of a cross, a triangle, a circle, or any other shape or shapes, or multiples of any suitable shape or shapes, or any suitable combination of shapes (preferably having sharp lines or structure that can be readily detected and identified via image processing). The target may also or otherwise comprise a color or colors that is/are less likely or least likely to occur naturally in the exterior scene at or around a vehicle (to enhance detection and recognition of the target by the system). The target can be mounted on a wall or a surface or a structure or tow bar or tongue 14a of the trailer that is near or facing the camera at the rear end of the pulling vehicle.

The target (or part of the trailer) may be detected and recognized via any suitable image processing and algorithms. For example, suitable or preferred target detecting algorithms include a regressive 2-D histogram that searches for and detects the center of a pattern (such as a pattern or the like). Another suitable type of algorithm is an edge detection algorithm. Optionally, and desirably, a target with designed high contrast edges may be used. With such an application, the processor can detect and track the trailer angle at the rear of the vehicle by detecting and locating and tracking or monitoring the coordinates of these signature edges. Optionally, the edge detection function or algorithm may comprise a Sobel gradient edge detection algorithm or other edge detection algorithms commercially available, and/or edge detection algorithms of the types described in U.S. Pat. Nos. 7,720,580; 7,038,577; 6,353,392 and/or 6,313,454, which are hereby incorporated herein by reference in their entireties. Another suitable type of algorithm is image pattern matching.

In the case of detection without an added target, a part or structure of the trailer may be identified and used as the "target" for image processing. Because an added target (such as described above) can be worn off, blown away by wind, or soiled by dirt, the addition of a separate target may affect or reduce the trailer angle detection accuracy in certain situations. Thus, a trailer angle detection system that does not include an add-on target on the trailer may be preferred.

The coordinates of the detected target in a captured image can be further transformed to the angle of trailer by applying a set of formulas. The formula can be implemented in the processor in the form of a set of arithmetic formulas, or may be implemented in the form of a look up table or tables. The formula is formed and determined by the dimensional characteristics of the trailer, the distance between the trailer body (or the location of the target or detected pattern or portion of the trailer) and the pulling vehicle (and/or the distance between the target and the pivoting joint at which the trailer is attached to the vehicle), the camera mounting position and angle, and the camera lens distortion characteristics.

The present invention provides a method of calibrating a camera-based trailer angle detection system, such as a trailer angle detection system of the types described in International Publication No. WO 2012/103193, incorporated above. In such a trailer angle detection system, there are several distances that need to be measured manually and entered into the system for constructing a mathematical model for use in converting the trailer angle detected in the camera image to the real world trailer angle. These dimensions and distances and parameters may include:

(i) Back of the vehicle bumper 12a to the center of the ball 12b;
(ii) Back of bumper 12a to center of target 18;
(iii) Back of bumper 12a to center of trailer axle 14b (or center of all axles);
(iv) Target to ground; and
(iv) Horizontal offset.

User measurement and manual entering of these parameters is not desirable because of potential user errors that may occur, such as measurement errors and/or input errors or the like. It is desirable to reduce or eliminate the number of user measurements for driver convenience and TAD system accuracy. The present invention provides a method that uses vehicle dimensions and dynamic turning while driving the vehicle forward to calibrate the TAD system without all or most of the user measurements. In other words, most or all of above mentioned parameters can be determined or calibrated using a dynamic turning method (such as shown in FIG. 4), as discussed below.

Figure 3:
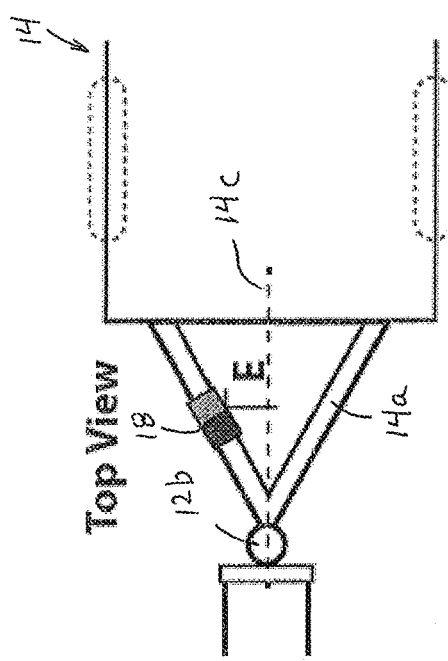
FIG. 3 is a plan view of the trailer hitching portion of the vehicle and trailer of FIG. 2.
Figure 2:
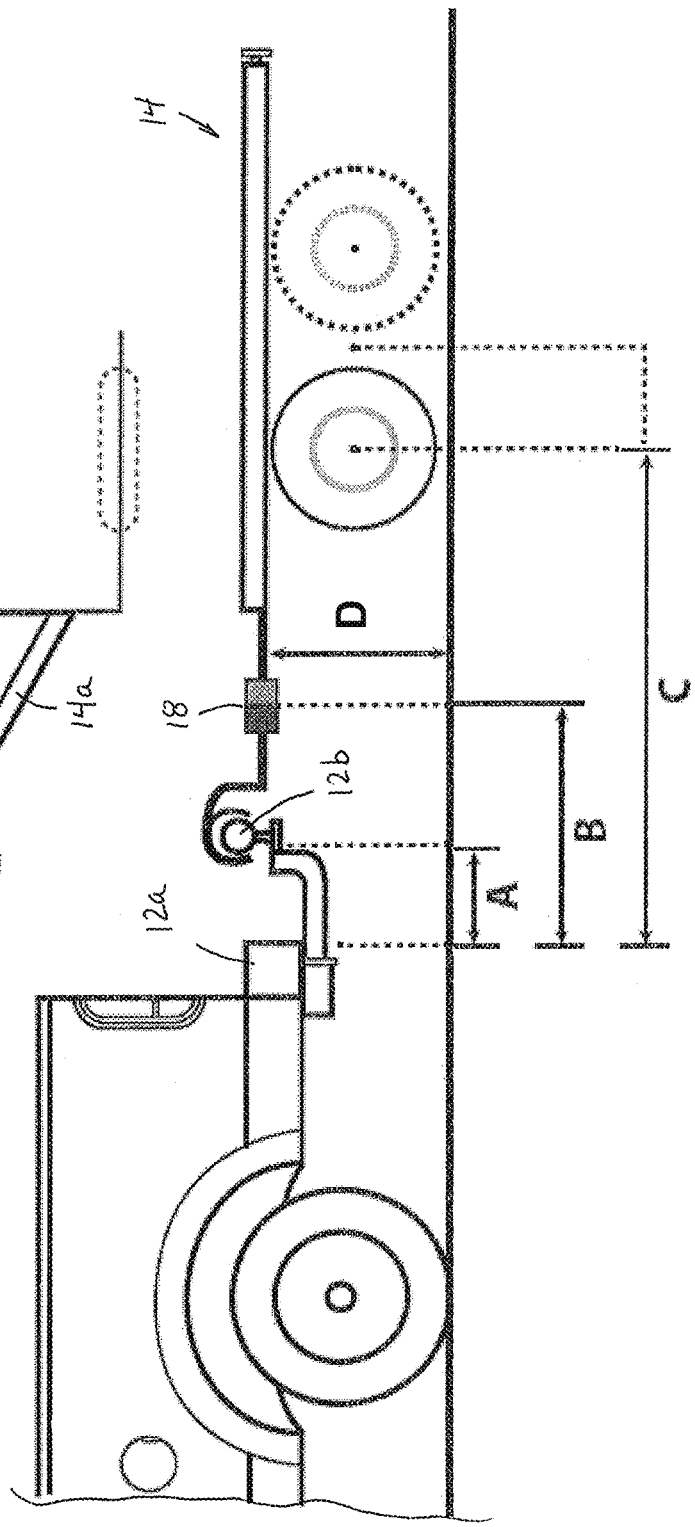
FIG. 2 is a side elevation of a vehicle with a trailer hitched thereto.
Figure 5:
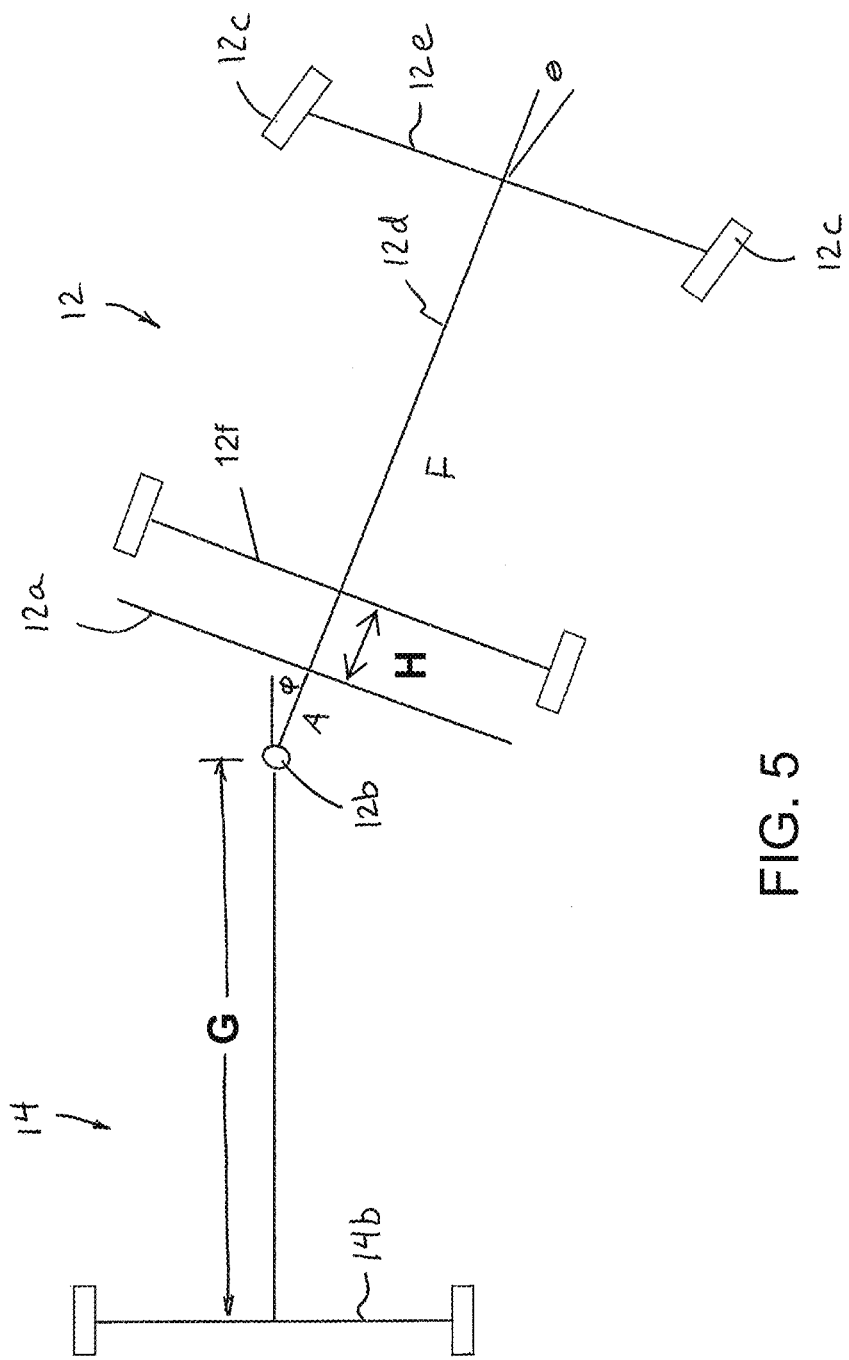
FIG. 5 is a schematic of the vehicle and trailer of FIGS. 1-4, showing the dimensions and angles that are determined by the calibration system of the present invention.
Figure 6:
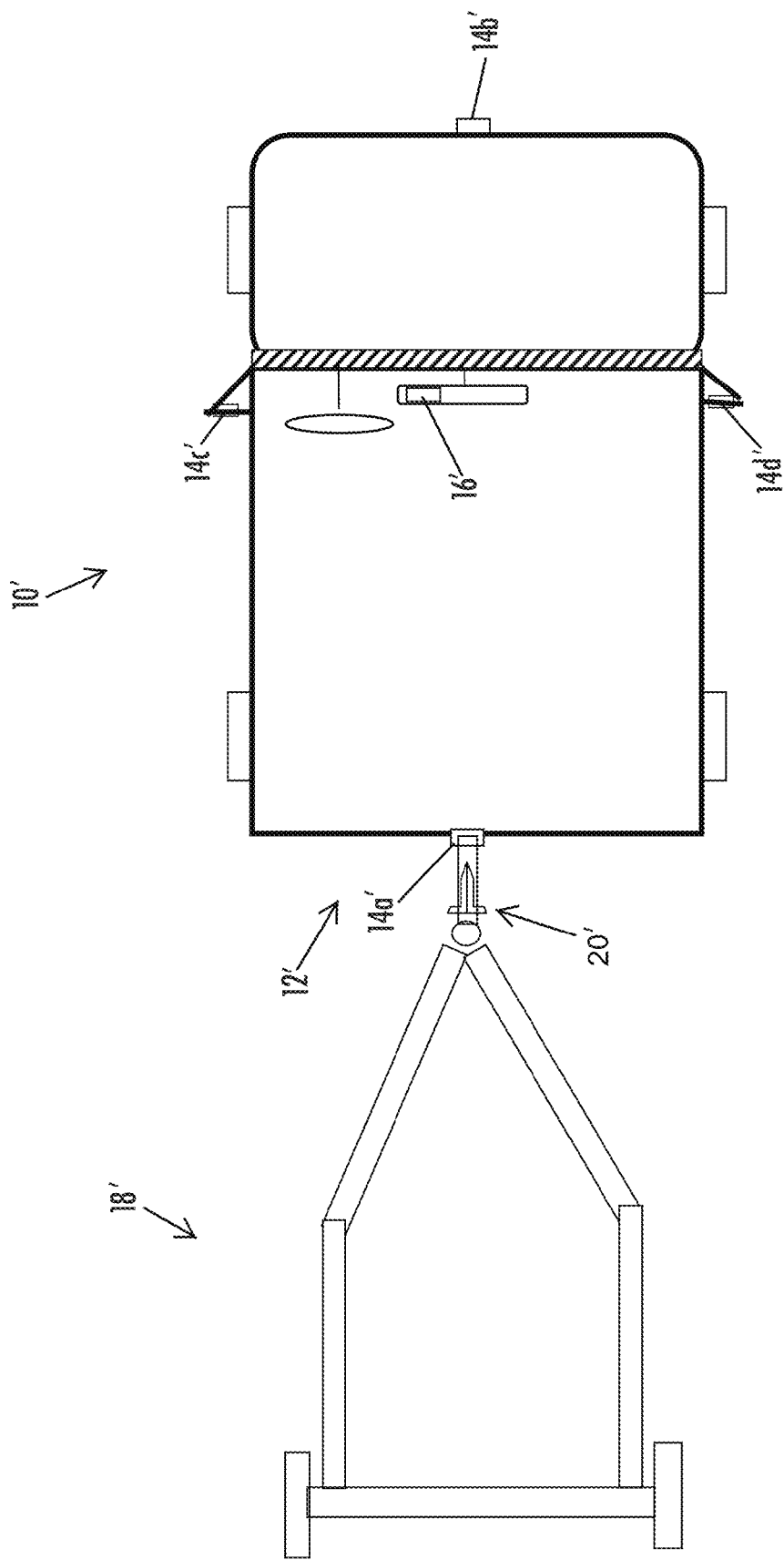
FIG. 6 is a plan view of a vehicle equipped with the rear vision system and trailer detection system of the present invention, shown towing a trailer having a structure or element disposed threat.

As shown in FIGS. 2, 3 and 5, various dimensions and parameters exist relative to the trailer and the vehicle when the trailer is hitched to the tow ball of the vehicle hitch. A set of mathematical formulas that directly or indirectly involve: the distance (A) from bumper 12a to tow ball 12b, the distance (B) from the bumper to the target 18, the distance (C) from the bumper to the trailer axle 14b, the trailer angle ((p), the distance (D) from the ground plane to the target, the distance (E) from the target to the longitudinal axis 14c of the trailer, the steering angle or angle (θ) between front wheels 12c and vehicle center line 12d, the individual front wheel speed, and time, exist according to the common rules of vehicle dynamics of turning. Additional parameters, or curves that are known already for a certain vehicle (such as, for example, the longitudinal distance (F) between the front wheel axle 12e and the bumper 12a and the distance (H) from the rear axle 12f to the bumper 12a) will be used in the formulas and computations of above to-be-calibrated parameters. These known parameters include: camera lens distortion parameters, camera mounting height, camera offset from the center line of vehicle, camera horizontal distance from bumper, and camera mounting angle on vehicle. With these formulas and known parameters, one can numerically solve above mentioned parameters by fitting to time based data that are acquired during turning operations.

Figure 4:
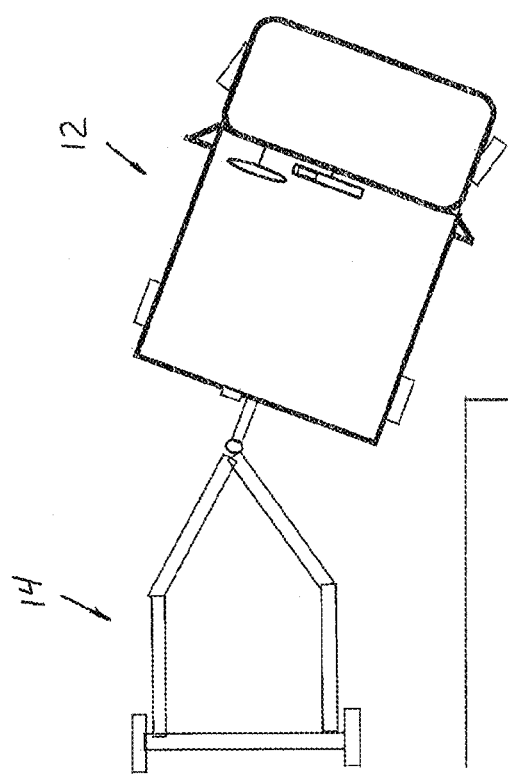
FIG. 4 is a plan view of the vehicle and trailer of FIGS. 1-3, shown as the vehicle is driven along a curve.

The calibration process involves pulling a trailer forward and turning on a road (such as shown in FIG. 4). It may also involve turning to opposite directions and making sharp and less sharp turns. The processor of the calibration system processes captured image data during such forward driving maneuvers to determine the above referenced parameters and, after the parameters are determined, utilizes those calculated parameters to calibrate the trailer angle detection system. For example, after the parameters are determined, the system may determine where the trailer target should be when the vehicle is traveling in a generally straight line (or within a threshold angle of straight) and/or a continuous or substantially continuous curved trajectory or path (with the curved path being determined at least in part by the steering angle of the vehicle), and if the target is not where the system expects it to be in the captured images, the calibration system may adjust or calibrate the trailer angle detection system accordingly. The system may calibrate the trailer angle detection system by adjusting the image processing by the processor, by adjusting the rearward field of view of the rearward facing camera and/or by applying an offset correction to the determined angle.

Another aspect of the present invention includes a co-validation or complement of the trailer angle measurement between a vehicle dynamic model based trailer angle detection and a camera based trailer angle detection (such as described in International Publication No. WO 2012/103193, incorporated above). For example, the camera based trailer angle detection system may be used or implemented as the primary trailer angle detection system, while the vehicle dynamic model based system may be used or implemented as the secondary trailer angle detection system to complement the primary TAD system. The two systems can be run in parallel, with the camera based TAD system checking for and correcting possible cumulated measurement errors of the secondary system.

The vehicle dynamic model based TAD system may inherently accumulate measurement error since it depends more on time integration of wheel speed, and other dynamic parameters for which the error may accumulate over time. With periodic cross checking with the primary TAD system, which provides a real time direct measurement of trailer angle, such cumulative errors of the secondary TAD system can be corrected. On the other hand, the primary TAD system is camera based, and thus may be affected by uncontrolled environmental factors, such as, for example, shadow casting on the target while turning, glare of sun light on the target and/or the like. During such temporal reduction of detection accuracy or even loss of target tracking during these events, the secondary TAD system can operate and temporarily take over before the primary system recovers. The two TAD systems may be operable to run on one hardware platform, such as an ECU or a camera or camera module or the like. The hardware platform may be connected to a vehicle bus (such as a CAN bus or a LIN bus of the vehicle) so that all the needed vehicle dynamic parameter values can be acquired via the bus, and the trailer angle and speed data can be sent through the bus to other needed ECUs/nodes. Optionally, the two TAD systems may run on two separate hardware platforms while they are connected with each other through a vehicle bus or other forms of communication or communication links or systems. The two systems may also acquire data from and send measurement data to other ECU or nodes via a vehicle bus or other communication link or system.

The rear view camera-based trailer angle detection can be used in, but is not limited to, several applications, including a trailer sway detection system (that detects a sway or swing of the trailer while the vehicle is towing the trailer in a forward direction along a road or highway), a rearward backup assist system (that detects the angle of the trailer and determines a reversing path or trajectory of the trailer during a reversing maneuver of the vehicle and trailer), and a trailer hitching system (that detects the trailer and guides the driver during backing up of the vehicle towards a trailer so that the trailer hitch of the vehicle is generally aligned with the tongue of the trailer).

Trailer Sway Detection and Alert/Compensation System.

When a trailer is pulled behind a vehicle at a relatively high speed, a lateral swing or sway of trailer can cause instability of the trailer and its pulling vehicle. By detecting the trailer angle in real time, the system of the present invention can detect the onset of lateral swing or sway of the trailer and may, responsive to such a detection, alert the driver of the swing or sway or control one or more vehicle or trailer systems or accessories to compensate for the detected swing or sway of the trailer. For example, the system may, responsive to a detection of a threshold degree of a lateral swing or sway of the trailer relative to the vehicle, be operable to generate an alert signal to the driver of the vehicle (such as an audible alert or visual alert or haptic alert or the like) to alert the driver of a potentially hazardous situation. Optionally, the system may control the brakes and/or steering of the vehicle and/or trailer to control the vehicle and trailer, such as in response to a detection of a threshold degree of sway or swing of the trailer relative to the vehicle. For example, the system may provide a closed loop control of the trailer angle by using individual braking of the pulling vehicle wheels and/or the trailer wheels to control or adjust or correct for the trailer swing or sway. Optionally, a steering wheel angle control (that may control or adjust the steering angle of the vehicle's wheels) or the like can also be part of closed loop control of trailer sway.

The trailer angle detection based on real time target or target-less image processing and/or algorithms can provide high speed and real time reading of the trailer angle of the trailer being towed by the pulling or towing vehicle. This reading can be used in real time trailer sway control. Optionally, the threshold level or degree of sway or swing of the trailer relative to the vehicle may be selected or preset, or may be dynamic, whereby the threshold degree may vary responsive to the speed of the vehicle and/or load of the trailer and/or the like. Optionally, and desirably, the system may only generate the alert and/or control the vehicle/trailer system or systems responsive to the detected swing or sway reaching or exceeding the threshold level and while the vehicle is traveling forwardly along the road.

Projection of Trailer Position During Trailer Backing Up.

The normal view of a backup camera on a trailer pulling vehicle is typically blocked by the trailer, and thus such a backup camera cannot provide visual backup assistance to the driver when the trailer is attached to the vehicle. However, the camera system of the present invention is operable to detect the angle of the trailer axis with respect to the pulling vehicle, and with the knowledge of the trailer dimensional characteristics (such as wheel position and distance from the vehicle and the like), the processor can calculate and project a trajectory or reversing path of the trailer in the form of graphic overlay on the camera display or video display (typically disposed in the vehicle, such as at or in or near an interior rearview mirror assembly of the vehicle) to indicate to the driver viewing the video display a path or trajectory of where the trailer is backing up to. In addition, when the trailer pulling or towing vehicle is equipped with side view cameras, the added views provided by the side cameras (typically having fields of view directed generally rearwardly and sidewardly with respect to the direction of forward travel of the equipped vehicle) can provide additional scene information of the trailer to assist the driver of the vehicle (viewing the images at a video display of the vehicle) during a reversing or backing up maneuver. The calculated graphical trailer path can be overlaid to the side camera image to further assist the driver of the vehicle during a reversing or backing up maneuver.

Optionally, the system may provide an alert (such as an audible alert or visual alert or haptic alert or the like) to alert the driver of a potentially hazardous situation during the reversing maneuver, such as responsive to detection of an object rearward of the trailer and in the path of the trailer (such as via processing of images captured by sideview cameras of the towing vehicle and/or processing of images captured by a rearward viewing camera at the rear of the trailer or the like). The alert may comprise any suitable alert, such as an alarm or tone or audible alert or a visual alert such as a highlighting of the displayed video images or the like in response to a detection of an object rearward of or at or near the rearward path of the trailer. Optionally, the system may control the brakes of the vehicle and/or trailer to slow or stop rearward movement of the vehicle and trailer in response to detection of an object in the rearward path of travel of the trailer and a determination that a collision may occur between the trailer and object.

Trailer Hitching.

Backing up a vehicle to hitch a trailer is not always intuitive process. If the position of the trailer hitching part is detected by identifying the tongue of the trailer that is to be attached to the vehicle, the processor can calculate a trajectory of the vehicle's hitch and guide the driver to turn the steering wheel of the vehicle and follow the trajectory to back the vehicle up to and in alignment with the trailer tongue for hitching the trailer to the vehicle. It is also envisioned that the control system may automatically turn the steering wheel of the vehicle to follow the calculated trajectory to position the vehicle's hitch at the trailer tongue for hitching the trailer to the vehicle. During the backing up process, a real time detection and tracking of a target at or on the trailer provides feedback and adjustment to the turning or control of the steering wheel of the vehicle.

Thus, the present invention provides automatic calibration of a trailer angle detection system and/or trailer monitoring system that is operable to detect the angle of a trailer being towed by a vehicle relative to a longitudinal axis of the towing vehicle. The calibration system is operable to determine various dimensions and parameters of the vehicle and trailer and vehicle-trailer interface or connection while the vehicle and trailer are driven along a road, based on capturing image data of the trailer and tow hitch during various forward turning maneuvers by the driver of the vehicle. After calibration of the system, the trailer angle detection and monitoring system can detect and monitor the angle of the trailer relative to the vehicle while the trailer is being towed along a road or highway, and may be operable to adjust or control one or more systems of the vehicle and/or trailer (such as a brake system of the vehicle and/or trailer and/or a steering system of the vehicle or the like) to correct for or adjust responsive to a detected sway or swing of the trailer during forward towing of the trailer. The present invention thus provides for dynamic calibration of a trailer angle detection system so that all or most of the user measurements during trailer setup can be limited or avoided or eliminated.

Optionally, the trailer angle detection system may assist the driver in backing up the trailer, such as via providing a graphic overlay at a video display of the vehicle, so as to guide the driver during a reversing maneuver with the trailer rearward of the vehicle. Optionally, the trailer angle detection system may assist the driver in backing up to an unhitched trailer to assist the driver in aligning the vehicle hitch with the tongue of the trailer.

Optionally, the trailer angle detection system may provide a trailer straight algorithm to determine when the vehicle and trailer are straight in order to calibrate and apply an offset correction to the angle determination and/or calculation. Such an algorithm or approach combines vehicle dynamics with computer vision techniques. The trailer angle detection system may be on the vehicle network, which allows it to receive vehicle information, such as individual wheel speed, steering wheel angle, and/or the like. When the vehicle pulls trailer and drives in a generally or substantially straight path, the angle of the trailer is at its zero (or substantially zero) degree angle and the system detects an offset angle to perform a calibration of the system. The following describes how the algorithms run and perform the calibration.

The first part of the algorithm looks at the average wheel speed for the left and right sides of the vehicle. When the mean speed of both sides is greater than zero and the difference between the two sides is within a given tolerance value, the second part of the algorithm engages. The second part of the algorithm looks at the angular movement of the trailer. This may be done using a target that is affixed to the trailer, but it could be extended to also look at the feature points, such as discussed above. If the angular movement of the trailer is within a tolerance level (in other words, not moving very much), and the first part still holds true (that there is straight or substantially straight movement of the vehicle), the angle calculation is averaged over a given period of time or distance traveled to calculate the offset, which is stored in the system memory and applied to subsequent angle determinations or calculations.

An alternative and simpler algorithm may function to read vehicle steering wheel angle through a vehicle network or bus. When the steering wheel angle is within a tolerance range of zero degrees, and vehicle wheel speed is greater than zero over a given period of time or distance traveled, the trailer angle is read and averaged as the offset that is stored in the system memory and applied to subsequent angle determinations or calculations.

Thus, the trailer monitoring or trailer angle detection system of the present invention may detect a target on or of a trailer or a portion of the trailer and may, such as via image processing, and may calculate and/or determine the angle of the trailer relative to the vehicle, such as relative to the longitudinal axis of the vehicle, such as via algorithmic processing.

Referring now to FIGS. 6-9, a vehicle 10' includes an imaging system or vision system or trailer angle viewing and detection system 12' that includes one or more imaging sensors or cameras (such as a rearward facing imaging sensor or camera 14a' and/or a forwardly facing camera 14b' at the front (or at the windshield) of the vehicle, and/or a sidewardly/rearwardly facing camera 14c', 14d' at the sides of the vehicle), which capture images exterior of the vehicle, with the cameras having a lens for focusing images at or onto an imaging array or imaging plane of the camera. The vision system 12' is operable to process image data captured by the cameras and may provide displayed images at a display device 16' for viewing by the driver of the vehicle. In the illustrated embodiment, the vehicle is towing a trailer 18' and the vision system 12' includes a device or element or plate or structure or target element 20' mounted or disposed at the trailer, such as centrally located at a forward portion of the trailer and in the field of view of the rearward facing camera 14a'. The system, responsive to processing of image data captured by the camera 14a', is operable to determine the relative angle between the trailer and the vehicle by determining an amount of a side portion of the structure or element 20' that is viewable by the rearward facing camera 14a', as discussed below.

The trailer angle viewing and detection system of the present invention may utilize aspects of the trailer angle detection systems described in PCT Application No. PCT/US2012/022517, filed Jan. 25, 2012 and published on Aug. 2, 2012 as International Publication No. WO 2012/103193, and/or U.S. provisional applications, Ser. No. 61/840,542, filed Jun. 28, 2013; Ser. No. 61/823,648, filed May 15, 2013; and/or Ser. No. 61/736,104, filed Dec. 12, 2012, which are hereby incorporated herein by reference in their entireties. Optionally, the system, responsive to processing of image data captured by the camera 14a' (and optionally cameras 14c'-d' and optionally one or more cameras at the trailer), may be operable to display a bird's eye view or top down view of the vehicle and trailer to assists the driver in maneuvering the vehicle with the trailer, such as during a reversing maneuver of the vehicle and trailer. Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like.

As discussed above, the display system may provide a projection of the trailer's position during a reversing maneuver. The normal view of a backup camera on a trailer pulling vehicle is typically blocked by the trailer, and thus such a backup camera cannot provide visual backup assistance to the driver when the trailer is attached to the vehicle. However, the camera system of the present invention may be operable to detect the angle of the trailer axis with respect to the pulling vehicle, and with the knowledge of the structure or element dimensional characteristics, the processor can determine the angle between the trailer and vehicle and may calculate and project a trajectory or reversing path of the trailer in the form of graphic overlay on the camera display or video display (typically disposed in the vehicle, such as at or in or near an interior rearview mirror assembly of the vehicle) to indicate to the driver viewing the video display a path or trajectory of where the trailer is backing up to. In addition, when the trailer pulling or towing vehicle is equipped with side view cameras, the added views provided by the side cameras (typically having fields of view directed generally rearwardly and sidewardly with respect to the direction of forward travel of the equipped vehicle) can provide additional scene information of the trailer to assist the driver of the vehicle (viewing the images at a video display of the vehicle) during a reversing or backing up maneuver. The calculated graphical trailer path can be overlaid to the side camera image to further assist the driver of the vehicle during a reversing or backing up maneuver.

Most drivers find it challenging to back up a trailer on their vehicle due to the dynamic interaction between the relative positions of the vehicle, trailer and front wheel angles. Most drivers use a trial and error method where they attempt to learn the results of the various stages of the maneuver by making short trial runs. The present invention provides a determination of the trailer angle and may be useful in assisting a driver in parking a trailer at a parking space.

When a camera is mounted at the back of a vehicle, particularly a light duty truck, at either a lower position, which would be in the mid-tailgate area or lower, or an upper or higher position, such as at the CHMSL (Center High Mounted Stop Lamp) area, it is difficult to determine through the camera what angle a trailer attached to that vehicle would be relative to the vehicle. The present invention provides a simple device or structure or element which can give indication to the angle of the trailer relative to the vehicle by using a camera and looking at a device or element or plate or structure at the trailer to determine the angle. Preferably, the device or structure or element is compact enough to mount at or on the trailer, does not interfere with the operation of the trailer, is inexpensive, and can give good image quality to a camera (such as by having a contrasting color at its sides so that the sides are readily detectable and discernible by the system) so that image processing of image data captured by the camera can determine the relative angle between the trailer and the vehicle.

Figure 7:
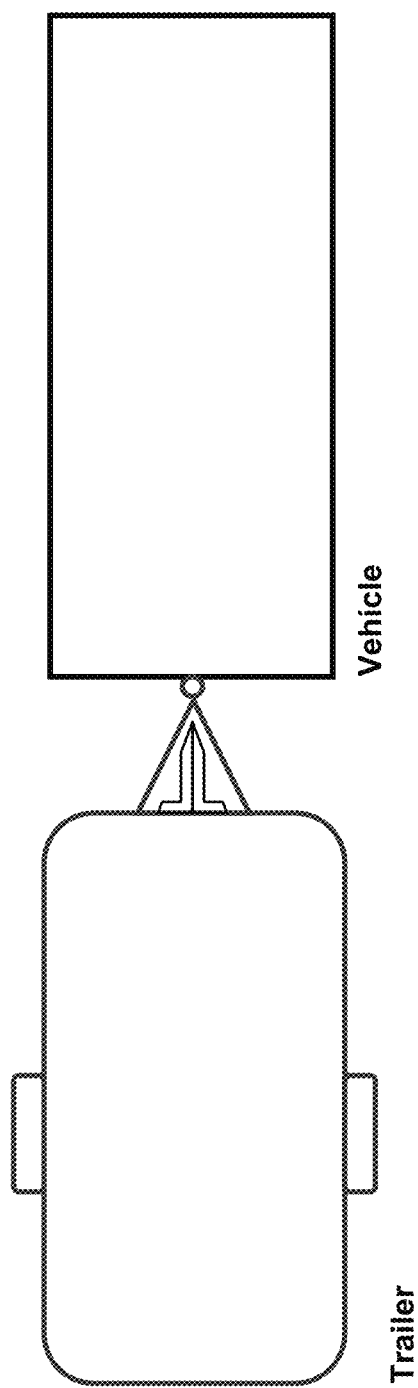
FIG. 7 is schematic of the vehicle and trailer of FIG. 6, showing the vehicle and trailer traveling in a straight path, with minimal exposure of the side of the structure or element to the rear facing camera.

In the illustrated embodiment, the device or structure or element or target element is mounted at the front of the trailer such that it is in the field of view of the rear facing camera at the vehicle. The camera is mounted at a center region of the vehicle so as to look straight at the structure or element such that the image of the structure or element as viewed by the camera while the trailer is straight (such as shown in FIG. 7) with the vehicle is at a minimum (in other words, the image does not include much or any of the side walls or sides of the structure or element). As the relative angle of the trailer to the vehicle departs from zero degrees (such as shown in FIGS. 8 and 9), the images of the structure or element as viewed by the camera grows in width and to the side opposite the angle between the vehicle and trailer. The image processor is operable to process the captured image data and can determine the relative angle between the vehicle and trailer based on the amount of the structure or element or sidewall of the structure or element that is viewed by the camera, and also based on dimensional characteristics of the structure or element.

The device or structure or element may comprise any suitable structure, such as a plate which can be made in numerous shapes and mounted at the trailer, such as at or in line with the center point of the pivot mount. The plate may be in the shape of a "T" or "Y", such that the section of the plate representing the vertical portion of the "T" or "Y" is co-linear with the centerline of the trailer and intersects with the pivot point of the mounting system. The plate has a height dimension that may protrude above the portion (such as the tongue of the trailer) so that the front end (which may be pointed or angled as shown in FIGS. 6-9) and the side walls or sides or side portions of the plate or structure or element are viewable by the camera.

For example, the plate may be approximately 8-10 inches long and 8-10 inches tall and about 4 inches wide. The two opposite sides of the plate may have distinctive coloring such that when a side of the plate is exposed (such as when the relative angle between the vehicle and trailer is not zero), the images of the plate as viewed and captured by the camera changes by exposing a wider colored portion of the plate to the camera as the relative angle between the vehicle and the trailer increases. The colors may be the same on both sides or one side may be one color and the other side may be another color, such as a contrasting color or the like, so that the camera can readily detect the colored sides. The plate may comprise any suitable shape, as long as the camera is centered to the plate and the plate is incidental to the trailer mounting point.

Therefore, the present invention provides a trailer angle detection system that includes a rearward facing camera and that, responsive to image processing of image data captured by the camera, is operable to detect the presence of a target or device or element or structure at a trailer and that is operable to detect or determine an amount of a side wall of the target that is exposed to and viewable by the camera as the relative angle between the trailer and towing vehicle changes. When the trailer is towed in a straight path, the camera will not view or detect any or much of the sides of the structure or element, and when the vehicle turns so that the relative angle between the trailer and vehicle is not zero, the camera will view and capture images of a portion of the respective side of the structure or element, with the size of the detected or viewed side portion varying depending on the size of the relative angle between the trailer and vehicle.

Figure 10:
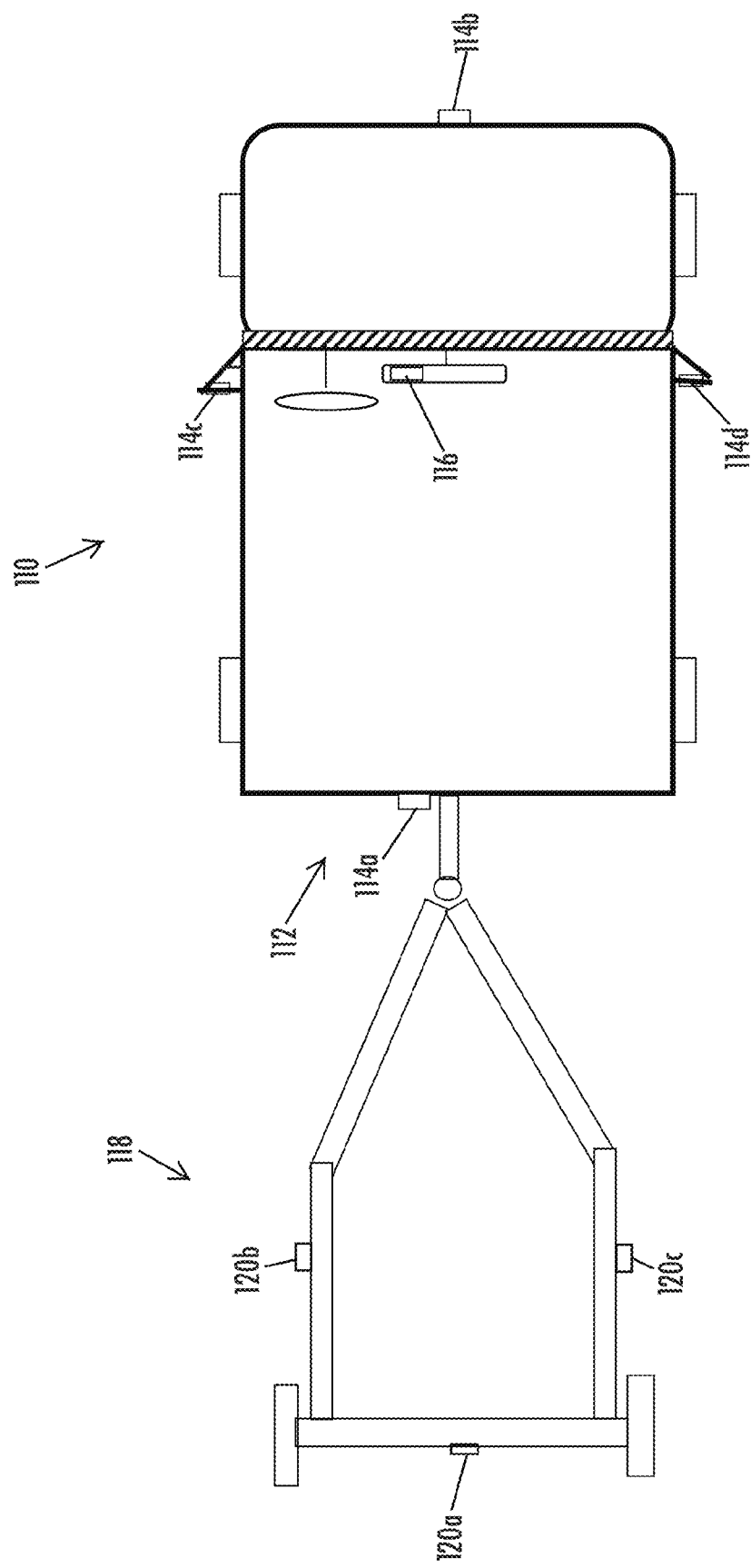
FIG. 10 is a plan view of a vehicle equipped with the rear vision system and trailer detection system of the present invention, shown towing a trailer.

Referring now to FIG. 10, a vehicle 110 includes an imaging system or vision system or trailer angle viewing and/or detection system 112 that includes one or more imaging sensors or cameras (such as a rearward facing imaging sensor or camera 114a and/or a forwardly facing camera 114b at the front (or at the windshield) of the vehicle, and/or a sidewardly/rearwardly facing camera 114c, 114d at the sides of the vehicle), which capture images exterior of the vehicle, with the cameras having a lens for focusing images at or onto an imaging array or imaging plane of the camera. The vision system 112 is operable to process image data captured by the cameras and may provide displayed images at a display device 116 for viewing by the driver of the vehicle. In the illustrated embodiment, the vehicle is towing a trailer 118 and the vision system 112 includes one or more cameras (or receives and processes image data captured by one or more cameras at the trailer), such as a rearward facing camera 120a at the rear of the trailer and sidewardly facing cameras 120b, 120c at the sides of the trailer. The system, responsive to processing of image data captured by the cameras 114a-d and 120a-c, may be operable to display a bird's eye view or top down view of the vehicle and trailer to assists the driver in maneuvering the vehicle with the trailer, such as during a reversing maneuver of the vehicle and trailer.

Figure 10A:
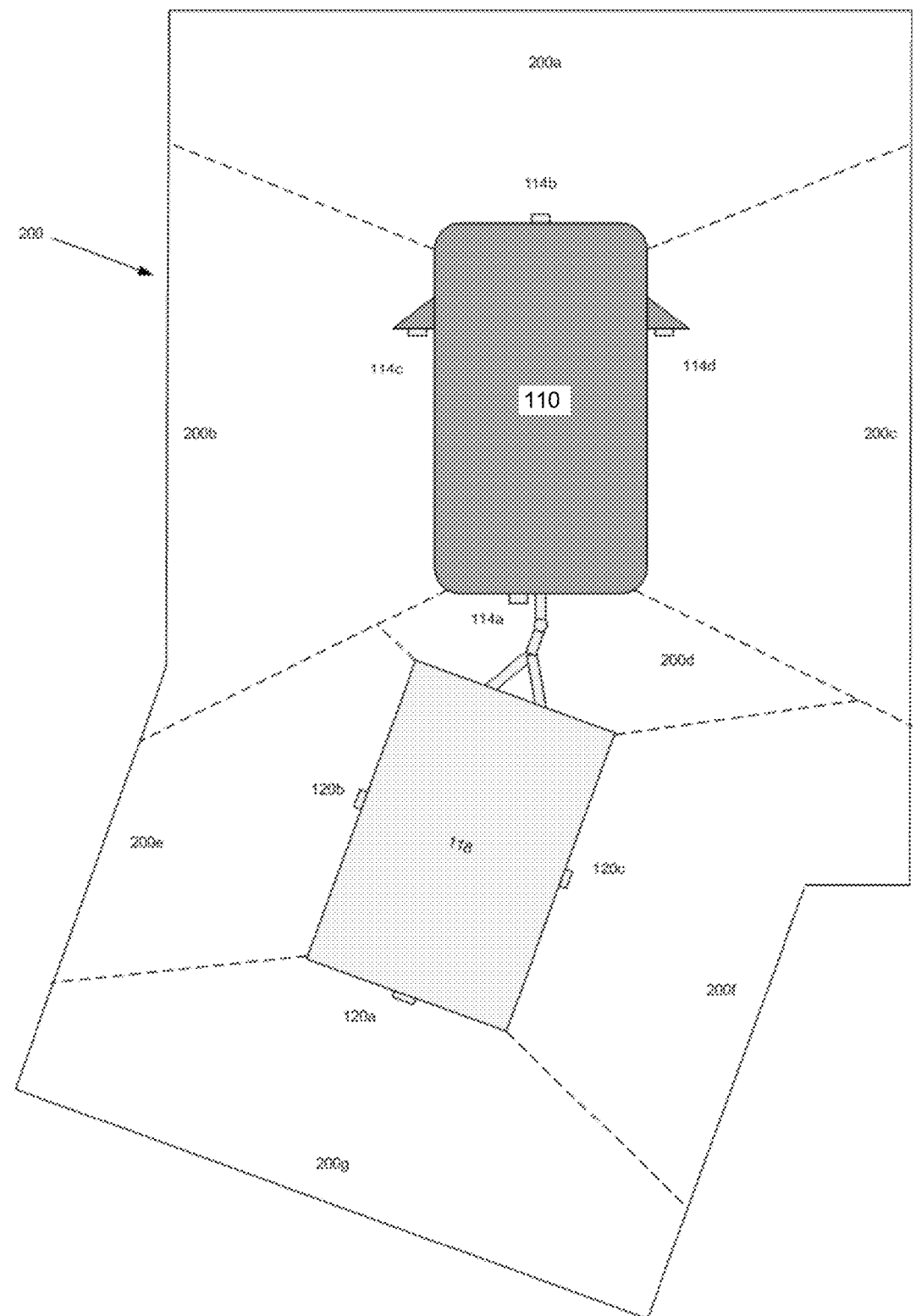
FIG. 10A is a bird's eye view displayed image of a vehicle and a trailer towed by the vehicle and of the surrounding area exterior to the vehicle and trailer.

The extended bird's eye view is stitched with views from vehicle and trailer cameras 114a-d and 120a-c. The camera views can be divided into two groups: a static group which comprise cameras 114a-d and a dynamic group which comprise cameras 120a-c. The pixel mapping through lookup table or formulas from the individual camera views to the bird's eye view include fixed mapping with vehicle cameras 114a-d and variable mapping with trailer cameras 120a-c. The trailer angle which is measured by the method above (and/or such as in the manner described in PCT Application No. PCT/US2012/022517, filed Jan. 25, 2012 and published on Aug. 2, 2012 as International Publication No. WO 2012/103193, and/or U.S. provisional applications, Ser. No. 61/840,542, filed Jun. 28, 2013; Ser. No. 61/823, 648, filed May 15, 2013; and/or Ser. No. 61/736,104, filed Dec. 12, 2012, which are hereby incorporated herein by reference in their entireties) determines how the variable pixel mapping is performed. In an illustration of the extended bird's eye view (FIG. 10A), the trailer part of the bird's eye view rotates in the ground plane by an angle identical to the trailer angle measured. The static areas 200a-c at the sides and front of the vehicle 110 are captured by the vehicle cameras 114b-d and mostly remain unchanged in camera pixel mapping. The areas 200d-g around the trailer 118 are dynamic and change pixel mapping with the trailer angle (relative to the vehicle). The border lines denoted by the dashed lines in FIG. 10A represent general overlap areas where adjacent camera views overlap and are stitched directly or with alpha blending.

Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like.

The trailer angle viewing system of the present invention may utilize aspects of the trailer angle detection systems described in PCT Application No. PCT/US2012/022517, filed Jan. 25, 2012 and published on Aug. 2, 2012 as International Publication No. WO 2012/103193, and/or U.S. provisional applications, Ser. No. 61/840,542, filed Jun. 28, 2013; Ser. No. 61/823,648, filed May 15, 2013; and/or Ser. No. 61/736,104, filed Dec. 12, 2012, which are hereby incorporated herein by reference in their entireties.

As discussed above, the display system may provide a projection of the trailer's position during a reversing maneuver. The normal view of a backup camera on a trailer pulling vehicle is typically blocked by the trailer, and thus such a backup camera cannot provide visual backup assistance to the driver when the trailer is attached to the vehicle. However, the camera system of the present invention may be operable to detect the angle of the trailer axis with respect to the pulling vehicle, and with the knowledge of the trailer dimensional characteristics (such as wheel position and distance from the vehicle and the like), the processor can calculate and project a trajectory or reversing path of the trailer in the form of graphic overlay on the camera display or video display (typically disposed in the vehicle, such as at or in or near an interior rearview mirror assembly of the vehicle) to indicate to the driver viewing the video display a path or trajectory of where the trailer is backing up to. In addition, when the trailer pulling or towing vehicle is equipped with side view cameras, the added views provided by the side cameras (typically having fields of view directed generally rearwardly and sidewardly with respect to the direction of forward travel of the equipped vehicle) can provide additional scene information of the trailer to assist the driver of the vehicle (viewing the images at a video display of the vehicle) during a reversing or backing up maneuver. The calculated graphical trailer path can be overlaid to the side camera image to further assist the driver of the vehicle during a reversing or backing up maneuver.

Most drivers find it challenging to back up a trailer on their vehicle due to the dynamic interaction between the relative positions of the vehicle, trailer and front wheel angles. Most drivers use a trial and error method where they attempt to learn the results of the various stages of the maneuver by making short trial runs. The present invention provides a dynamic real-time depiction of the vehicle and trailer trajectories so that the driver can immediately see future paths of both the vehicle and the trailer as the vehicle steering wheel is turned, such as when the driver is performing a reversing maneuver of the vehicle and trailer.

Figure 11:
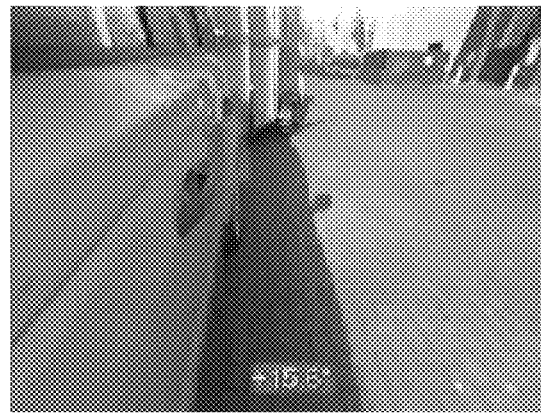
FIG. 11 is a side view at the side of a vehicle with a trailer, showing graphic overlays in the perspective view.
Figure 12:
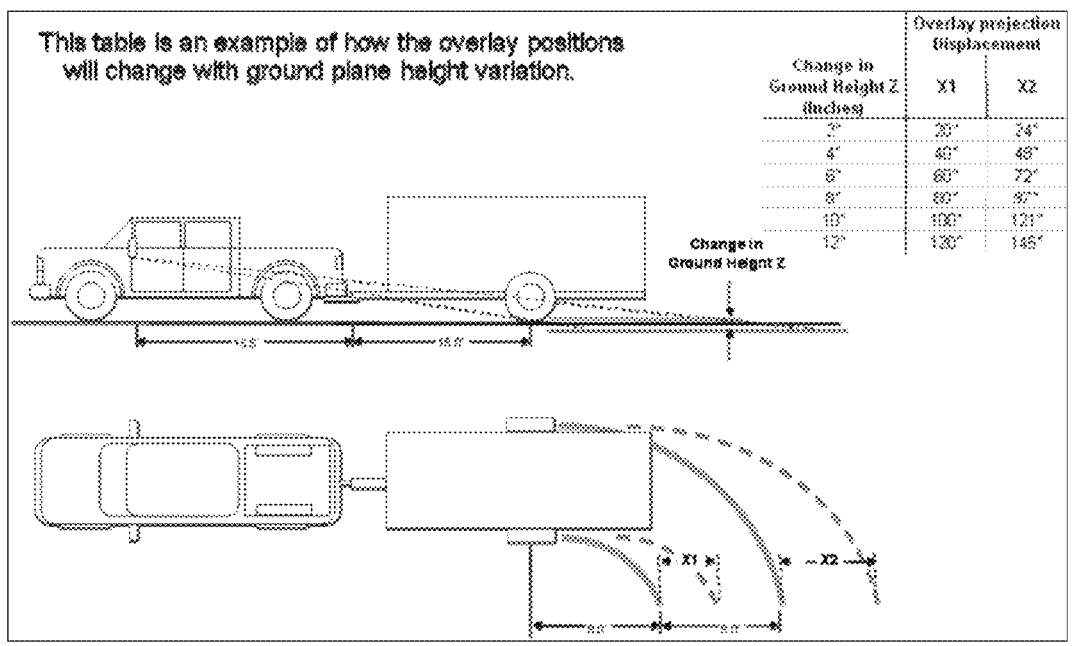
FIG. 12 is a table showing a side elevation and a top view of a vehicle and trailer, showing how the graphic overlays change with variations in the ground plane elevation.
Figure 13:
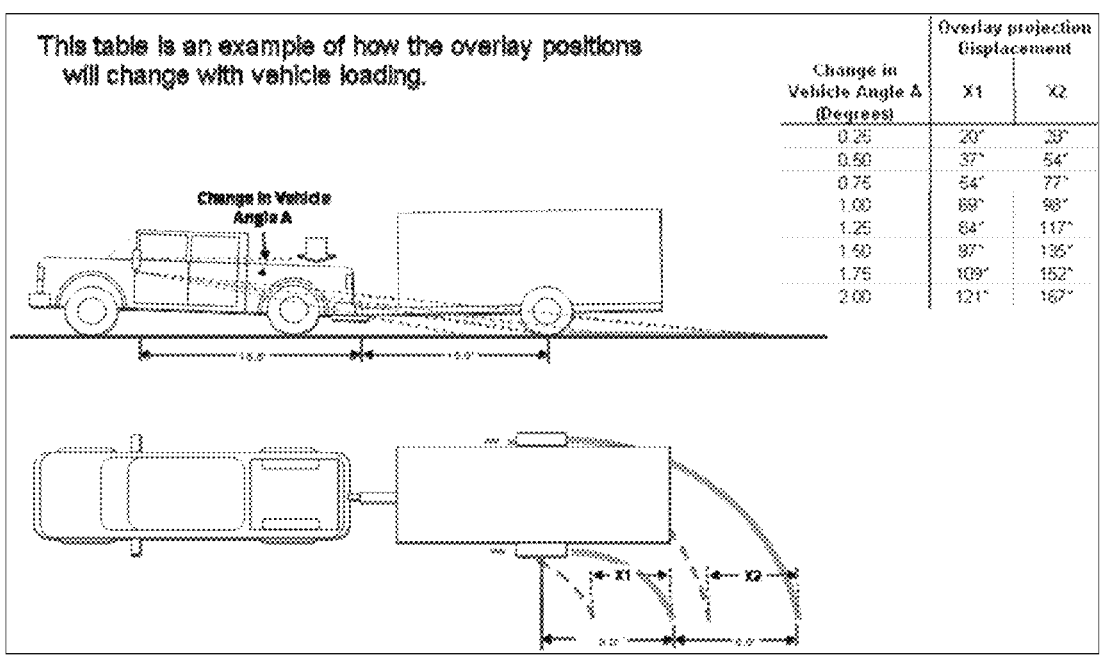
FIG. 13 is a table showing a side elevation and a top view of a vehicle and trailer, showing how the graphic overlays change with variations in the load of the towing vehicle.

Some systems provide a display of a side view from the side mirror cameras with dynamic trailer and vehicle tire trajectory overlays. For example, a side and rear viewing camera may capture image data at the side and rear of the vehicle, and the field of view of the camera may encompass a portion of the trailer. Images derived from the captured image data may be displayed, such as shown in FIG. 11, and an overlay may be provided showing the path of the vehicle and of the trailer during a reversing maneuver of the vehicle. However, and as can be seen with reference to FIG. 11, issues may arise with this approach. For example, the projected position of an overlay at this distance (mirror camera-to-trailer tire) is highly sensitive to slight changes in ground contour and vehicle angle. Approximate effects of variations in ground elevation or contour are shown in FIG. 12, and approximate effects of variations in the vehicle angle (such as due to an increased or reduced load in the vehicle or a greater or reduced tongue weight of the trailer) are shown in FIG. 13. Another concern may be that the projected view (FIG. 11) may be confusing because of the displayed perspective view for the driver, whereby the inside trailer wheel trajectory overlay appears to be very distant and often has a counter-intuitive shape.

Figure 14:
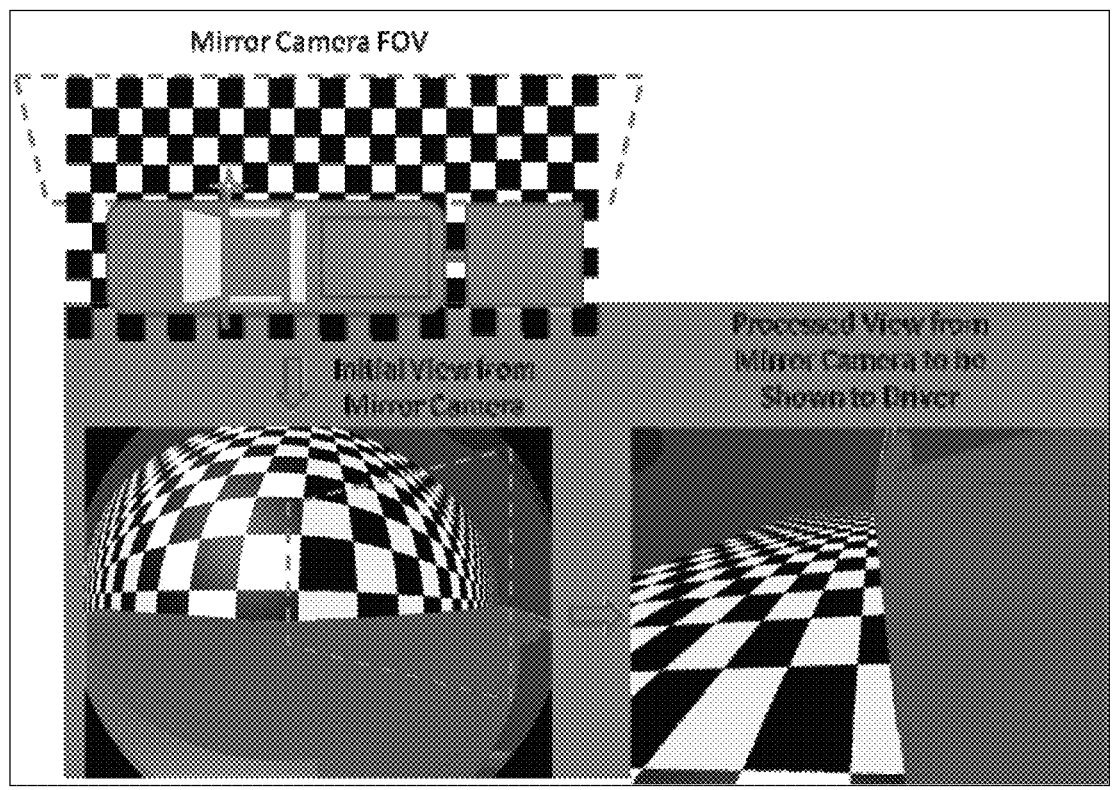
FIG. 14 is a schematic showing the field of view of a side camera at a vehicle and showing how the view is displayed after processing of captured image data.
Figure 15:
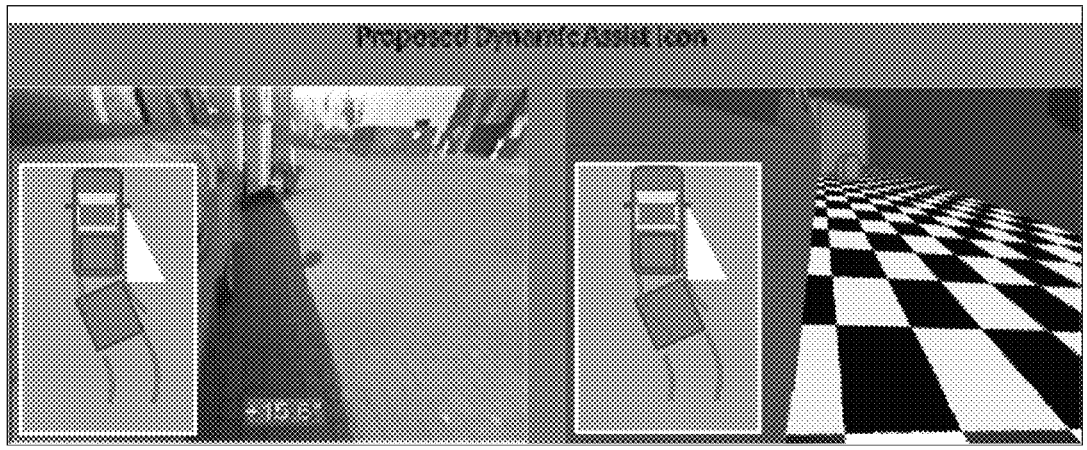
FIG. 15 is a schematic showing a dynamic icon top view of a vehicle and trailer icon and showing the projected path of the trailer icon based on the current steering wheel angle of the equipped vehicle.
Figure 16:
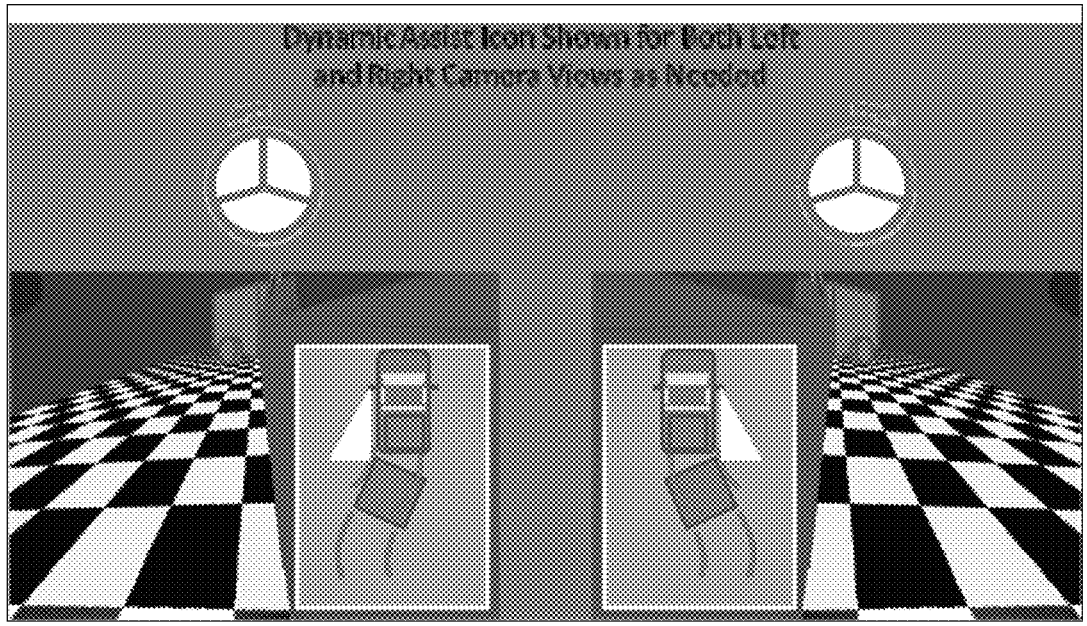
FIG. 16 is a schematic showing the dynamic icon top view of the vehicle and trailer like in FIG. 15, and showing it for both the passenger side and driver side views.

The present invention provides a dynamic vehicle and trailer icon overlay that represents a top down view of a vehicle and trailer. As shown in FIG. 15, a side view image (such as captured by a camera at the side exterior mirror of the vehicle, and such as may be processed for display as shown in FIG. 14) may have a dynamic icon overlaid thereat. For example, the side view image may be displayed at a display screen at the interior rearview mirror assembly of the vehicle or elsewhere in the cabin of the vehicle for viewing by the driver of the vehicle during the reversing maneuver. Optionally, it is envisioned that the side view image may be the reflected image at the side mirror and a display of the side mirror assembly may provide or display the dynamic icon thereat. As can be seen in FIG. 15, the dynamic icon may be overlaid or established at or over a displayed image derived from image data captured by the side view camera or the dynamic icon may be overlaid or established at or on an iconistic or animation display of the vehicle and trailer (based on image data captured by the side view camera). As shown in FIG. 16, the dynamic icon or icons may be provided for side image displays at or associated with each side of the vehicle.

The dynamic icon comprises a top view representation of a vehicle and trailer with projected paths or trajectories for the vehicle and for the trailer so the driver can readily determine where the trailer will travel when he or she turns the vehicle's steering wheel. The icon includes a highlighted area (such as the generally triangular area with its apex at or near the side mirror) to indicate to the driver the view at which the icon is overlaid so that the driver can readily discern and understand what he or she is viewing. The dynamic overlay is dynamic and the trailer and the projected paths of the vehicle and of the trailer will be adjusted or varied responsive, at least in part, to the steering wheel angle of the vehicle (and may be based on calculated or determined or input characteristics of the trailer and vehicle, such as trailer angle and trailer length and width and the like). For example, when the driver of the vehicle turns the steering wheel in one direction and begins to backup the vehicle and trailer, the trailer of the dynamic icon may pivot relative to the vehicle of the dynamic icon, and the projected paths of the wheels of the vehicle and trailer may move or track accordingly. As the steering wheel is further turned or is straightened, the trailer and projected paths adjust accordingly, so that, at any time during the reversing maneuver, the driver can readily see how the trailer is angled relative to the vehicle and where it will travel if the vehicle reverses with the steering wheel at that position. The dynamic icon or overlay thus may be adjusted in response to the steering wheel angle or steering angle of the vehicle and a trailer angle relative to the vehicle and/or other vehicle and/or trailer characteristics or parameters. Optionally, the dynamic overlay and side/rear image may be displayed responsive to the vehicle being shifter into reverse to commence a reversing maneuver, and optionally, further responsive to a detection of the presence of the trailer at the rear of the vehicle.

Figure 17:
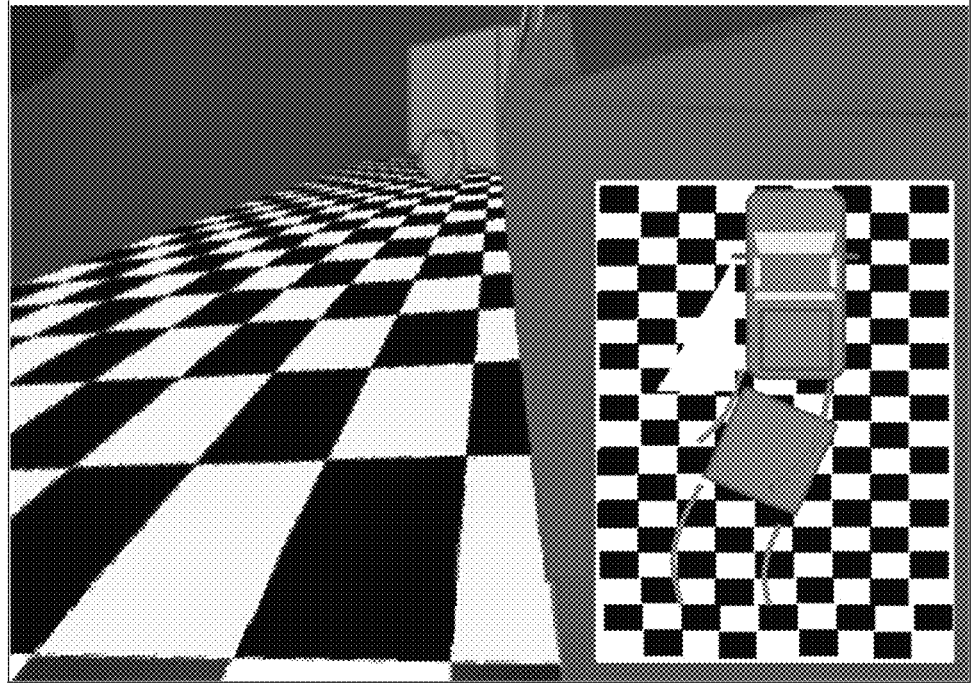
FIG. 17 is a view of a dynamic icon view with live top-down view of the vehicle and trailer and showing the projected path of the trailer based on the current steering wheel angle of the equipped vehicle.
Figure 19:
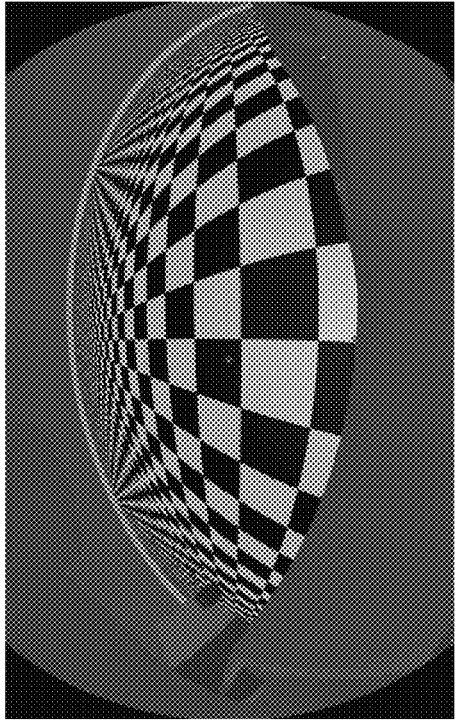
FIG. 19 shows a rear view image as captured by an opposite side sideward and rearward viewing camera of the vehicle, with the trailer angled towards that side, such as during a reversing maneuver of the vehicle and trailer.
Figure 18:
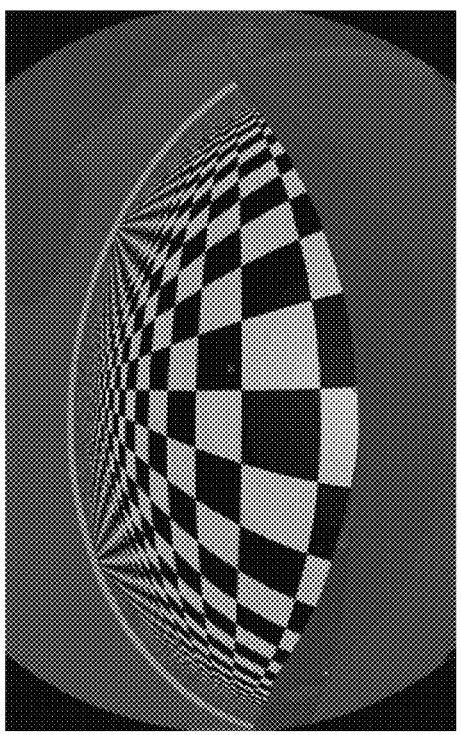
FIG. 18 shows a rear view image as captured by a sideward and rearward viewing camera of a vehicle.

Optionally, and such as shown in FIG. 17, the dynamic overlay of the vehicle-trailer top down view may comprise a real time display of the vehicle and trailer and ground area surrounding the vehicle based on image data captured by the vehicle cameras 114*a-d* and the trailer cameras 120*a-c* (such as at least a rearward camera at the rear of the trailer and a side camera at each side of either or both of the vehicle and trailer). The dynamic overlay thus provides the driver with an enhanced understanding of what is being displayed and viewed and, by including the surrounding area in the dynamic overlay, the driver can readily view and discern and recognize objects present in the areas surrounding the vehicle. For example, the real time dynamic overlay of the present invention may allow the user to readily view and discern the parking space or boat launch ramp or the like that he or she is backing the trailer towards and the overlay may show the projected path or trajectory of the trailer based on the steering wheel angle. The real time dynamic overlay also may show the driver when the front of the vehicle (that is being turned via the turning of the steering wheels) is approaching an object at the side of the vehicle, such as when reversing the trailer along a relatively narrow road surface or the like.

For example, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO2012/075250, and/or PCT Application No. PCT/US2012/048993, filed Jul. 31, 2012 and published on Feb. 7, 2013 as International Publication No. WO 2013/019795, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012 and published Nov. 1, 2012 as International Publication No. WO 2012/145822, and/or PCT Application No. PCT/US2012/066571, filed Nov. 27, 2012 and published Jun. 6, 2013 as International Publication No. WO 2013/081985, and/or PCT Application No. PCT/US2012/068331, filed Dec. 7, 2012 and published Jun. 13, 2013 as International Publication No. WO 2013/086249, and/or U.S. patent application Ser. No. 13/333,337, filed Dec. 21, 2011, now U.S. Pat. No. 9,264,672, which are hereby incorporated herein by reference in their entireties.

The present invention thus provides a simple top-down dynamic icon view that depicts the system behavior in real-time and in a comprehensive manner. This depiction can be superimposed over mirror camera views so that the driver can readily see and discern the needed view of the trailer as well as understand the effects of selected steering wheel positions. The present invention also provides a live top-down 360 degree view (or bird's eye view or the like) that includes the trailer. In such an application, one or more side and rear cameras would be included on the trailer and image processing would process image data captured by the trailer and vehicle cameras to take the trailer position into account to maintain the stitched scene. The dynamic icon is superimposed over the displayed top-down scene.

Figure 20:
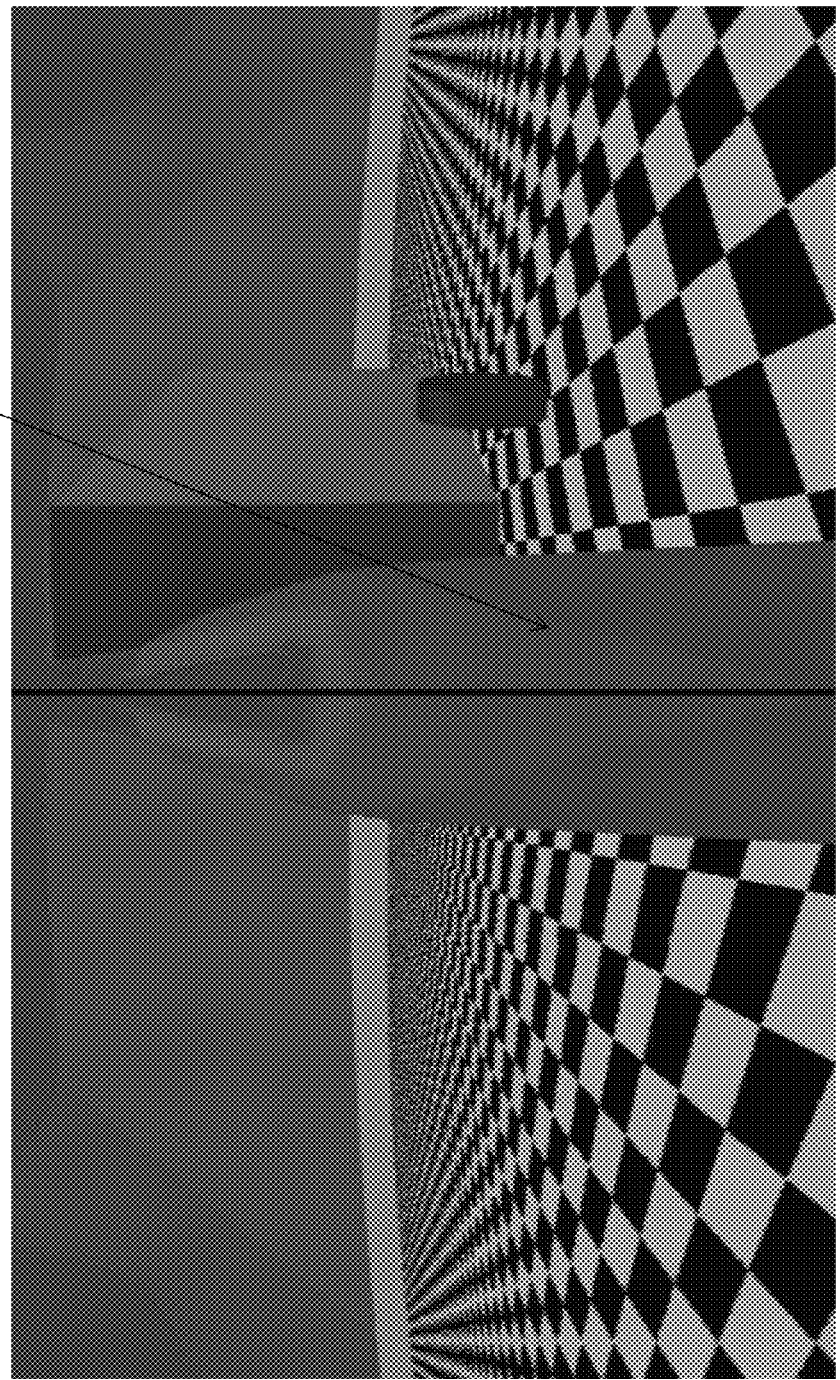
FIG. 20 shows a combined and corrected image that incorporates the images of FIGS. 18 and 19.

Optionally, and with reference to FIGS. 18-22, the raw captured image data (distorted) from the right side camera (FIG. 18) and the left side camera (FIG. 19) may be combined and corrected or undistorted (such as via optical correction or electronic correction) to provide a combined image (FIG. 20). The combined mirror camera view or image can appear as if an observer is looking rearward from in front of the vehicle so that the observer sees the full arc of the trailer's path in an unbroken manner. However, the viewable sides of the vehicle or too much ground coverage near the cameras can disrupt the appearance.

Figure 21:
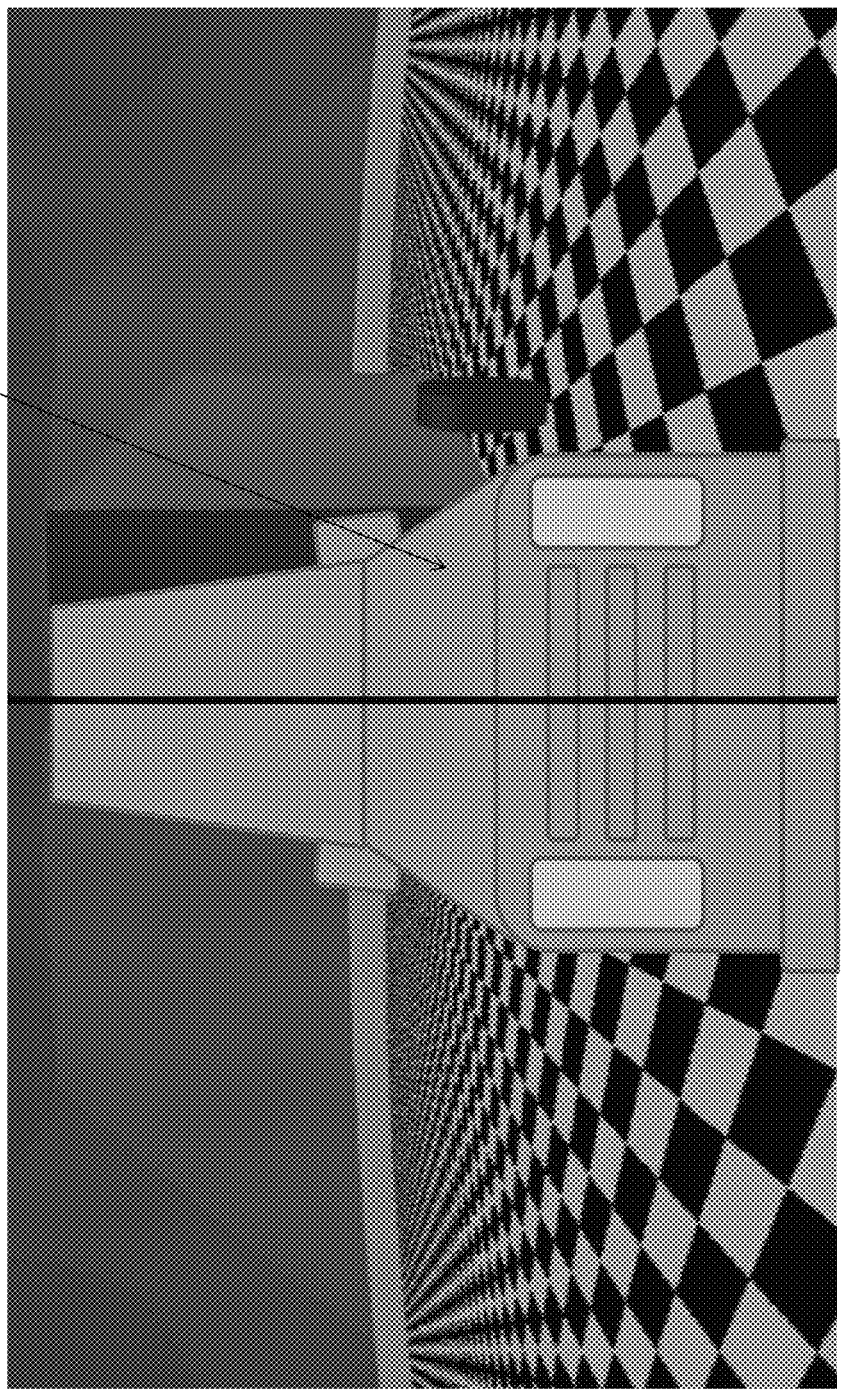
FIG. 21 shows another combined and corrected displayed image similar to FIG. 20, but with a partial representation of the vehicle displayed therein in accordance with the present invention.
Figure 22:
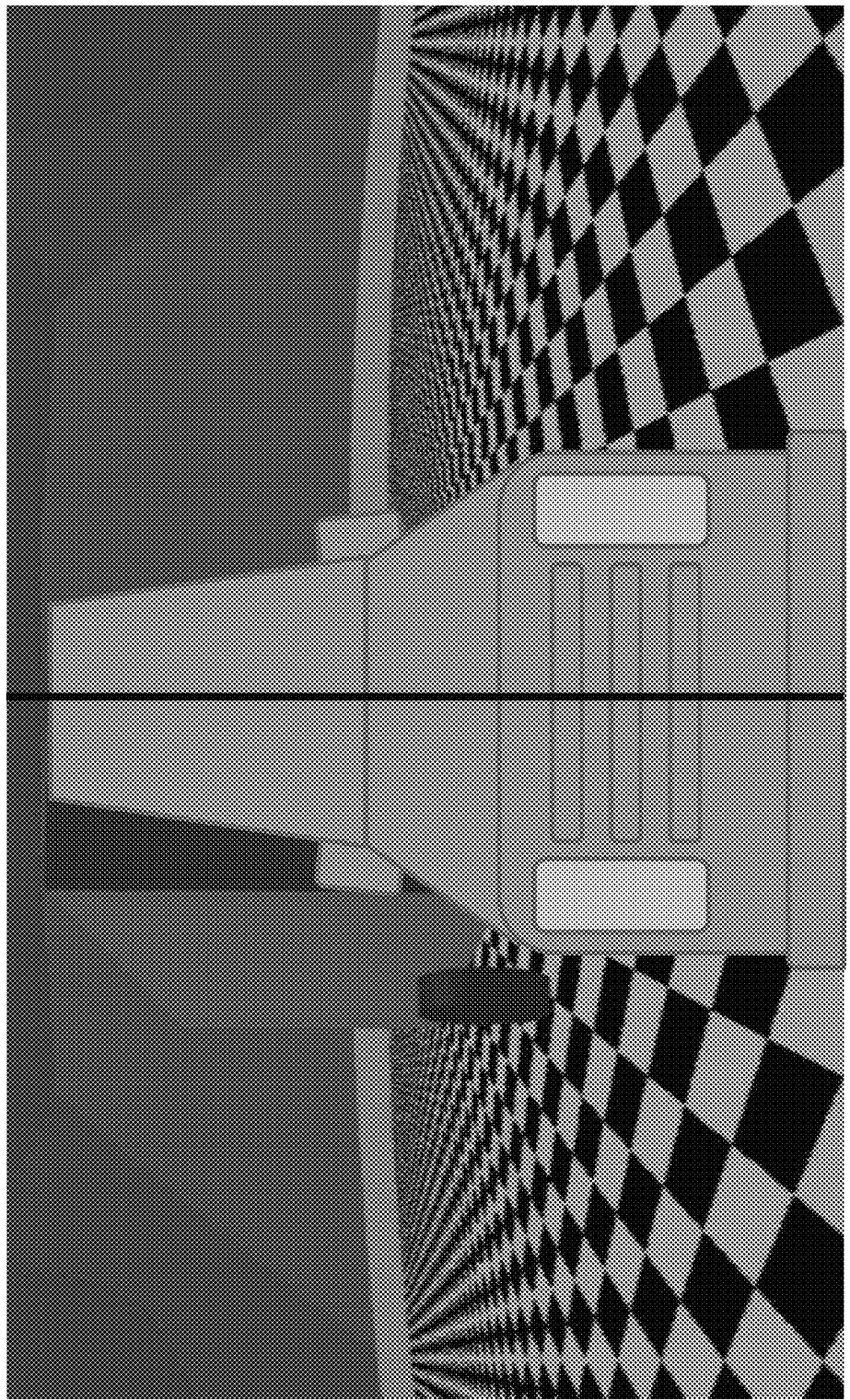
FIG. 22 is another displayed image similar to FIG. 21, but with the trailer angled in the opposite direction with respect to the vehicle.

Thus, and as shown in FIGS. 21 and 22, the present invention may provide an enhanced view of the trailer and vehicle that is more readily discernible and understandable by the driver of the vehicle, such as during a reversing maneuver of the vehicle and trailer. By keeping the view up and directed straight back or rearward along the vehicle, and by including a vehicle icon or representation (such as shown in FIGS. 21 and 22), such as an overlay or graphic overlay that is generated by the system and electronically superimposed on the displayed image, the display system can provide a more comprehensive appearance that the driver can readily discern and understand. Thus, and such as in a similar manner as with bird's eye view displays, the driver is provided with an enhanced sense of vehicle positioning with respect to the trailer and surrounding objects within the scene.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066570, filed Nov. 27, 2012 and published Jun. 6, 2013 as International Publication No. WO 2013/081984, and/or PCT Application No. PCT/

US2012/066571, filed Nov. 27, 2012 and published Jun. 6, 2013 as International Publication No. WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/103193; WO 2012/0116043; WO 2012/0145501; WO 2012/0145343; WO 2012/154919; WO 2013/019707; WO 2013/016409; WO 2012/145822; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715 and/or PCT Application No. PCT/US2012/056014, filed Sep. 19, 2012 and published Mar. 28, 2013 as International Publication No. WO 2013/043661, and/or PCT Application No. PCT/US2013/036701, filed Apr. 16, 2013 and published Oct. 24, 2013 as International Publication No. WO 2013/158592 and/or U.S. patent applications, Ser. No. 14/016,790, filed Sep. 3, 2013 and published Mar. 6, 2014 as U.S. Publication No. 2014/0067206; Ser. No. 14/001,272, filed Aug. 23, 2013 and published Dec. 12, 2013 as U.S. Publication No. 2013/0328672; Ser. No. 13/970,868, filed Aug. 20, 2013 and published Feb. 20, 2014 as U.S. Publication No. 2014/0049646; Ser. No. 13/964,134, filed Aug. 12, 2013 and published Feb. 20, 2014 as U.S. Publication No. 2014/0052340; Ser. No. 13/942,758, filed Jul. 16, 2013 and published Jan. 23, 2014 as U.S. Publication No. 2014/0025240; Ser. No. 13/942,753, filed Jul. 16, 2013 and published Jan. 30, 2014 as U.S. Publication No. 2014/0028852; Ser. No. 13/927,680, filed Jun. 26, 2013 and published Jan. 2, 2014 as U.S. Publication No. 2014/0005907; Ser. No. 13/916,051, filed Jun. 12, 2013, now U.S. Pat. No. 9,077,098; Ser. No. 13/894,870, filed May 15, 2013 and published Nov. 28, 2013 as U.S. Publication No. 2013/0314503; Ser. No. 13/887,724, filed May 6, 2013 and published Nov. 14, 2013 as U.S. Publication No. 2013/0298866; Ser. No. 13/851,378, filed Mar. 27, 2013 and published Nov. 14, 2013 as U.S. Publication No. 2013/0300869; Ser. No. 61/848,796, filed Mar. 22, 2012 and published Oct. 24, 2013 as U.S. Publication No. 2013/0278769; Ser. No. 13/847,815, filed Mar. 20, 2013 and published Oct. 31, 2013 as U.S. Publication No. 2013/0286193; Ser. No. 13/800,697, filed Mar. 13, 2013 and published on Oct. 3, 2013 as U.S. Publication No. 2013/0258077; Ser. No. 13/785,099, filed Mar. 5, 2013 and published Sep. 19, 2013 as U.S. Publication No. 2013/0242099; Ser. No. 13/779,881, filed Feb. 28, 2013, now U.S. Pat. No. 8,694,224; Ser. No. 13/774,317, filed Feb. 22, 2013 and published Aug. 29, 2013 as U.S. Publication No. 2013/0222592; Ser. No. 13/774,315, filed Feb. 22, 2013 and published Aug. 22, 2013 as U.S. Publication No. 2013/0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012 and published Jan. 3, 2013 as U.S. Publication No. 2013/002873, and/or U.S. provisional applications, Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,834, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/840,542; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/834,129, filed Jun. 12, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/16,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/840,407, filed Apr. 10, 2013; Ser. No. 61/808,930, filed Apr. 5, 2013; Ser. No. 61/807,050, filed Apr. 1, 2013; Ser. No. 61/806,674, filed Mar. 29, 2013; Ser. No. 61/806,673, filed Mar. 29, 2013; Ser.

No. 61/804,786, filed Mar. 25, 2013; Ser. No. 61/793,592, filed Mar. 15, 2013; Ser. No. 61/793,614, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/770,048, filed Feb. 27, 2013; Ser. No. 61/766,883, filed Feb. 20, 2013; Ser. No. 61/760,366, filed Feb. 4, 2013; Ser. No. 61/760,364, filed Feb. 4, 2013; Ser. No. 61/756,832, filed Jan. 25, 2013; Ser. No. 61/754,804, filed Jan. 21, 2013; Ser. No. 61/745,925, filed Dec. 26, 2012; Ser. No. 61/745,864, filed Dec. 26, 2012; Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/718,382, filed Oct. 25, 2012; Ser. No. 61/713,772, filed Oct. 15, 2012; Ser. No. 61/710,924, filed Oct. 8, 2012; and/or Ser. No. 61/710,247, filed Oct. 2, 2012, which are all hereby incorporated herein by reference in their entireties. The system may communicate with other communication systems via any suitable means, such as by utilizing aspects of the systems described in International Publication No. WO 2013/043661, PCT Application No. PCT/US10/038477, filed Jun. 14, 2010, and/or PCT Application No. PCT/US2012/066571, filed Nov. 27, 2012 and published Jun. 6, 2013 as International Publication No. WO 2013/081985, and/or U.S. patent application Ser. No. 13/202,005, filed Aug. 17, 2011, now U.S. Pat. No. 9,126,525, which are hereby incorporated herein by reference in their entireties.

Typically, a rearward facing camera for a rear vision system or backup assist system is activated responsive to the driver of the equipped vehicle shifting the gear actuator into a reverse gear position, whereby video images captured by the camera are displayed at the video display screen. When the reversing maneuver is completed, such as when the driver of the vehicle finally shifts the gear actuator out of the reverse gear position (and into either a park or neutral position or a forward gear position), display of the images captured by the camera ceases and the camera is often deactivated. The vision display system may operate to display the rearward images at the video mirror display responsive to the driver of the vehicle shifting the vehicle into a reverse gear such as by utilizing aspects of the vision systems described in U.S. Pat. Nos. U.S. Pat. Nos. 5,550,677; 5,670,935; 6,498,620; 6,222,447 and/or 5,949,331, and/or PCT Application No. PCT/US2011/056295, filed Oct. 14, 2011 and published Apr. 19, 2012 as International Publication No. WO 2012/051500, and/or U.S. patent application Ser. No. 13/333,337, filed Dec. 21, 2011, now U.S. Pat. No. 9,264,672, which are hereby incorporated herein by reference in their entireties.

During forward travel of the vehicle, such as when the vehicle shifter is shifted to a forward or drive gear position, the rear camera may capture images of the trailer for determining and monitoring the trailer angle, as discussed above. Such operation of the rear camera during forward travel (and associated processing of the captured images and the like) may be responsive to the vehicle speed reaching a threshold level and a signal indicative of the vehicle towing a trailer (such as a signal indicative of a connection of a trailer wiring harness to a vehicle wiring harness or the like), such that the activation of the rear camera and subsequent or corresponding monitoring of the trailer angle only occurs in situations when it is desired or appropriate.

The rearward facing camera or camera module may comprise any suitable camera or imaging sensor, and may utilize aspects of the cameras or sensors described in U.S. Pat. Nos. 7,965,336 and/or 7,480,149, and/or U.S. patent application Ser. No. 12/091,359, filed Apr. 24, 2008 and published Oct. 1, 2009 as U.S. Publication No. US-2009-0244361, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,720,580; 7,965,336; 7,339,149; 7,038,577 and 7,004,606, and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

Optionally, the rearward facing camera may have a wide angle rearward field of view, such as a wide angle rearward field of view that encompasses about 185 degrees (fields of view larger and smaller than this may be contemplated while remaining within the spirit and scope of the present invention). Thus, during a reversing maneuver, the rearward facing camera and video processor and video display screen can operate to display entire images (or substantially entire images) captured by the rearward facing camera (such as, for example, images encompassed by the about 185 degree field of view of the camera), in order to provide video images to the driver of the vehicle of a wide area or region or blind zone immediately rearward of the vehicle to assist the driver of the vehicle in making the reversing maneuver. The rearward facing camera and/or video processor and/or video display screen and/or backup assist system may utilize aspects of the systems described in U.S. Pat. Nos. 5,550,677; 5,760,962; 5,670,935; 6,201,642; 6,396,397; 6,498,620; 6,717,610; 6,757,109; 7,005,974 and/or 7,265,656, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012 and published Jan. 31, 2013 as International Publication No. WO 2013/016409, and/or U.S. patent application Ser. No. 13/534,657, filed Jun. 27, 2012 and published Jan. 3, 2013 as U.S. Publication No. 2013/0002873, which are all hereby incorporated herein by reference in their entireties. The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor and processor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional application Ser. No. 60/618,686, filed Oct. 14, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip (such as of the display or camera system or image processor or the like) may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent applications, Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. 2010/0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The display is operable to display the captured rearward images and may comprise a video display and may utilize aspects of the video display devices or modules described in U.S. Pat. Nos. 6,690,268; 7,184,190; 7,274,501; 7,370,983; 7,446,650 and/or 7,855,755, and/or U.S. patent application Ser. No. 10/538,724, filed Jun. 13, 2005 and published Mar. 9, 2006 as U.S. Publication No. US-2006-0050018, which are all hereby incorporated herein by reference in their entireties. The video display may be operable to display images captured by one or more imaging sensors or cameras at the vehicle. The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 6,198,409; 7,005,974; 7,123,168; 7,004,606; 6,946,978; 7,038,577; 6,353,392; 6,320,176; 6,313,454 and 6,824,281, which are all hereby incorporated herein by reference in their entireties.

The video display screen may disposed at an interior rearview mirror assembly of the vehicle (such as in a mirror casing and behind a reflective element of a mirror assembly such that displayed information is viewable through the reflective element of the mirror assembly). The interior mirror assembly may comprise an electro-optic reflective element, such as an electrochromic reflective element, having a transflective mirror reflector (such as one or more thin metallic films or coatings disposed on a surface of a substrate of the reflective element, such as disposed on the front surface of the rear substrate, commonly referred to as the third surface of the mirror reflective element) that is partially transmissive of visible light therethrough and partially reflectant of visible light incident thereon, such as a mirror reflective element of the types described in U.S. Pat. Nos. 7,274,501; 7,255,451; 7,195,381; 7,184,190; 5,668,663; 5,724,187 and/or 6,690,268, which are all hereby incorporated herein by reference in their entireties). Thus, the video display screen, when operating to display video images or the like, is viewable through the transflective mirror reflector and the mirror reflective element by the driver of the vehicle and, when the video display screen is not operating to display video images or the like, the video display screen is not readily viewable or observable or discernible to the driver of the vehicle, such that the presence of the video display screen is rendered covert by the transflective mirror reflector and the driver of the vehicle normally views the mirror reflector and reflective element to view the reflected rearward image at the mirror reflective element. Optionally, the video display screen may be disposed elsewhere in the vehicle, such as at or in an accessory module or windshield electronics module or overhead console or center stack region of the instrument panel or elsewhere at the instrument panel or other areas of the vehicle, while remaining within the spirit and scope of the present invention.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described International Publication Nos. WO 2010/099416; WO 2011/028686; WO 2012/075250; WO 2013/019795; WO 2012-075250; WO 2012/154919; WO 2012/0116043; WO 2012/0145501 and/or WO 2012/0145313, and/or PCT Application No. PCT/CA2012/000378, filed Apr. 25, 2012 and published Nov. 1, 2012 as International Publication No. WO 2012/145822, and/or PCT Application No. PCT/US2012/066571, filed Nov. 27, 2012 and published Jun. 6, 2013 as International Publication No. WO 2013/081985, and/or PCT Application No. PCT/US2012/068331, filed Dec. 7, 2012 and published Jun. 13, 2013 as International Publication No. WO 2013/086249, and/or PCT Application No. PCT/US2013/022119, filed Jan. 18, 2013 and published Jul. 25, 2013 as International Publication No. WO 2013/109869, and/or U.S. patent application Ser. No. 13/333,337, filed Dec. 21, 2011, now U.S. Pat. No. 9,264,672, which are hereby incorporated herein by reference in their entireties.

Optionally, the mirror assembly may include one or more displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,855,755; 7,626,749; 7,581,859; 7,338,177; 7,274,501; 7,255,451; 7,195,381; 7,184,190; 5,668,663; 5,724,187 and/or 6,690,268, and/or in U.S. patent applications, Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties, so that the displays are viewable through the reflective element, while the display area still functions to substantially reflect light, in order to provide a generally uniform prismatic reflective element even in the areas that have display elements positioned behind the reflective element. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036 and/or 7,274,501, which are all hereby incorporated herein by reference in their entireties.

Optionally, the vehicle may include one or more other accessories at or within the mirror assembly or otherwise associated with or near the mirror assembly, such as one or more electrical or electronic devices or accessories, such as a blind spot detection system, such as disclosed in U.S. Pat. Nos. 5,929,786; 8,058,977; 5,786,772; 7,720,580; 7,492,281; 7,038,577 and 6,882,287, a communication module, such as disclosed in U.S. Pat. No. 5,798,688, a voice recorder, microphones, such as disclosed in U.S. Pat. Nos. 7,657,052; 6,243,003; 6,278,377 and/or 6,420,975, speakers, antennas, including global positioning system (GPS) or cellular phone antennas, such as disclosed in U.S. Pat. No. 5,971,552, transmitters and/or receivers, such as a garage door opener or the like or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093 and/or U.S. patent application Ser. No. 12/781,119, filed May 17, 2010 and published Nov. 17, 2011 as U.S. Publication No. US 2011-0280026, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, an imaging system or components or circuitry or display thereof, such as an imaging and/or display system of the types described in U.S. Pat. Nos. 7,881,496; 7,526,103; 7,400,435; 6,690,268 and 6,847,487, and/or U.S. patent applications Ser. No. 12/578,732, filed Oct. 14, 2009 and published Apr. 22, 2010 as U.S. Publication No. 2010/0097469; and/or Ser. No. 12/508,840, filed Jul. 24, 2009 and published Jan. 28, 2010 as U.S. Publication No. 2010/0020170, an alert system, such as an alert system of the types described in PCT Application No. PCT/US2010/25545, filed Feb. 26, 2010 and published Sep. 2, 2010 as International Publication No. WO 2010/099416, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522), and/or an ONSTAR® system, a compass, such as disclosed in U.S. Pat. Nos. 5,924,212; 4,862,594; 4,937,945; 5,131,154; 5,255,442 and/or 5,632,092, a control system, such as a control system of the types described in PCT Application No. PCT/US10/38477, filed Jun. 14, 2010 and published Dec. 16, 2010 as International Publication No. WO 2010/144900, and/or any other accessory or circuitry or the like (with the disclosures of the above-referenced patents and patent applications and PCT applications being hereby incorporated herein by reference in their entireties).

The accessory or accessories may be positioned at or within a mirror casing of the interior rearview mirror assembly and may be included on or integrated in the printed circuit board positioned within the mirror casing, such as along a rear surface of the reflective element or elsewhere within a cavity defined by the casing, without affecting the scope of the present invention. The user actuatable inputs described above may be actuatable to control and/or adjust the accessories of the mirror assembly/system and/or an overhead console and/or an accessory module/windshield electronics module and/or the vehicle. The connection or link between the controls and the systems or accessories may be provided via vehicle electronic or communication systems and the like, and may be connected via various protocols or nodes, such as BLUETOOTH®, SCP, UBP, J1850, CAN J2284, Fire Wire 1394, MOST, LIN, FLEXRAY™, Byte Flight and/or the like, or other vehicle-based or in-vehicle communication links or systems (such as WIFI and/or IRDA) and/or the like, depending on the particular application of the mirror/accessory system and the vehicle. Optionally, the connections or links may be provided via wireless connectivity or links, such as via a wireless communication network or system, such as described in U.S. Pat. No. 7,004,593, which is hereby incorporated herein by reference in its entirety, without affecting the scope of the present invention.

Optionally, a display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538, 724, filed Jun. 13, 2005 and published Mar. 9, 2006 as U.S. Publication No. US-2006-0050018, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A dynamic calibration method for calibrating a trailer angle detection system of a vehicle towing a trailer, said dynamic calibration method comprising:
    providing a plurality of cameras;
    wherein providing a plurality of cameras comprises providing a rearward viewing camera at a rear portion of a vehicle equipped with said trailer angle detection system so as to have at least a rearward field of view;
    wherein providing a plurality of cameras comprises providing a driver side camera at a driver side portion of the equipped vehicle so as to have at least a sideward and rearward field of view;
    wherein providing a plurality of cameras comprises providing a passenger side camera at a passenger side portion of the equipped vehicle so as to have at least a sideward and rearward field of view;
    providing a processor that processes image data captured by said rearward viewing camera, said driver side camera and said passenger side camera;
    attaching a trailer to the equipped vehicle and rearward of the equipped vehicle;
    driving the equipped vehicle forward while the equipped vehicle is towing the trailer;
    processing, using said processor, image data captured by at least some of said cameras while the equipped vehicle is being driven forwardly and towing the trailer;
    determining a location of a portion of the trailer via processing by said processor of image data captured by at least some of said cameras while the equipped vehicle is being driven forwardly and towing the trailer;
    responsive at least in part to processing by said processor of image data captured by at least some of said cameras while the equipped vehicle is being driven forwardly and towing the trailer, determining a plurality of trailer parameters and vehicle-trailer interface parameters;
    wherein determining the plurality of trailer parameters and vehicle-trailer interface parameters is performed while the vehicle is being driven forwardly and towing the trailer; and
    calibrating the trailer angle detection system of the equipped vehicle responsive to determination, via processing by said processor of image data captured by at least some of said cameras, that the portion of the trailer is not where said trailer angle detection system expects it to be when the equipped vehicle is traveling straight forward.

2. The dynamic calibration method of claim 1, wherein calibrating the trailer angle detection system comprises adjusting processing by said processor of image data captured by at least some of said cameras by adjusting at least one of (i) the rearward field of view of said rearward viewing camera and (ii) applying an offset correction to a determined angle of the trailer relative to the equipped vehicle.

3. The dynamic calibration method of claim 1, comprising processing by said processor of image data captured by at least some of said cameras to determine a determined trailer angle of the trailer relative to a longitudinal axis of the equipped vehicle, and determining, via processing by said processor of image data captured by at least some of said cameras, the location of the portion of the trailer relative to the equipped vehicle.

4. The dynamic calibration method of claim 3, comprising determining the determined trailer angle of the trailer at least responsive to the determined location of the portion of the trailer.

5. The dynamic calibration method of claim 3, wherein the portion of the trailer has opposite side portions, and wherein said method comprises determining, responsive to processing by said processor of image data captured by at least some of said cameras, an amount of a side portion of the portion of the trailer that is exposed to and viewable by at least one of said cameras, and determining, responsive to the determination of the exposed amount, an estimated trailer angle relative to the equipped vehicle.

6. The dynamic calibration method of claim 5, wherein the opposite side portions of the portion of the trailer comprise colored side portions.

7. The dynamic calibration method of claim 5, wherein the portion of the trailer comprises a target that extends above the trailer where the target is disposed.

8. The dynamic calibration method of claim 5, wherein said camera is disposed at a centerline of the equipped vehicle and wherein the portion of the trailer is at a longitudinal axis of the trailer.

9. The dynamic calibration method of claim 1, wherein the determined trailer parameters and vehicle-trailer interface parameters include at least one of (i) a distance between a rear bumper of the equipped vehicle and a tow ball of the equipped vehicle at which the trailer is attached, (ii) a distance between a tow ball of the equipped vehicle at which the trailer is attached and an axle of the trailer, (iii) a distance between a tow ball of the equipped vehicle at which the trailer is attached and a portion of the trailer, and (iv) a distance between a portion of the trailer and a longitudinal axis of the trailer.

10. The dynamic calibration method of claim 1, comprising calculating a calculated trailer angle based at least in part on calculations involving the determined parameters and a steering angle of the equipped vehicle while the equipped vehicle is being driven forwardly and towing the trailer, and based at least in part on vehicle parameters.

11. The dynamic calibration method of claim 10, wherein the vehicle parameters include (i) a distance between a front wheel axle of the equipped vehicle and the bumper of the equipped vehicle, (ii) a distance between a rear wheel axle of the equipped vehicle and the bumper of the equipped vehicle and (iii) a steering angle of the equipped vehicle.

12. The dynamic calibration method of claim 1, comprising:
   calculating a calculated trailer angle based at least in part on calculations involving the determined parameters and a steering angle of the equipped vehicle while the equipped vehicle is being driven forwardly and towing the trailer,
   determining, responsive to processing by said processor of image data captured by at least some of said cameras, a determined trailer angle of the trailer relative to a longitudinal axis of the equipped vehicle while the equipped vehicle is being driven forwardly and towing the trailer,
   determining a degree of offset between the calculated trailer angle and the determined trailer angle while the equipped vehicle is being driven forwardly and towing the trailer, and
   calibrating the trailer angle detection system when the determined offset is greater than a threshold level.

13. The dynamic calibration method of claim 12, wherein the trailer angle detection system is calibrated via at least one of (i) adjusting image data processing by said processor, (ii) adjusting the rearward field of view of said rearward viewing camera and (iii) applying an offset correction to the determined trailer angle.

14. The dynamic calibration method of claim 12, comprising generating an alert signal to alert the driver of a potentially hazardous situation while the equipped vehicle is towing the trailer.

15. A dynamic calibration method for calibrating a trailer angle detection system of a vehicle towing a trailer, said dynamic calibration method comprising:
   providing a plurality of cameras;
   wherein providing a plurality of cameras comprises providing a rearward viewing camera at a rear portion of a vehicle equipped with said trailer angle detection system so as to have at least a rearward field of view;
   wherein providing a plurality of cameras comprises providing a driver side camera at a driver side portion of the equipped vehicle so as to have at least a sideward and rearward field of view;
   wherein providing a plurality of cameras comprises providing a passenger side camera at a passenger side portion of the equipped vehicle so as to have at least a sideward and rearward field of view;
   providing a processor that processes image data captured by said rearward viewing camera, said driver side camera and said passenger side camera;
   attaching a trailer to the equipped vehicle and rearward of the equipped vehicle;
   driving the equipped vehicle forward while the equipped vehicle is towing the trailer;
   processing, using said processor, image data captured by at least some of said cameras while the equipped vehicle is being driven forwardly and towing the trailer;
   determining a location of a portion of the trailer via processing by said processor of image data captured by at least some of said cameras while the equipped vehicle is being driven forwardly and towing the trailer;
   responsive at least in part to processing by said processor of image data captured by at least some of said cameras while the equipped vehicle is being driven forwardly and towing the trailer, determining a plurality of trailer parameters and vehicle-trailer interface parameters;
   wherein the determined trailer parameters and vehicle-trailer interface parameters include at least one of (i) a distance between a rear bumper of the equipped vehicle and a tow ball of the equipped vehicle at which the trailer is attached, (ii) a distance between a tow ball of the equipped vehicle at which the trailer is attached and an axle of the trailer, (iii) a distance between a tow ball of the equipped vehicle at which the trailer is attached and a portion of the trailer, and (iv) a distance between a portion of the trailer and a longitudinal axis of the trailer;
   wherein determining the plurality of trailer parameters and vehicle-trailer interface parameters is performed while the vehicle is being driven forwardly and towing the trailer;
   calculating a calculated trailer angle based at least in part on calculations involving the determined parameters and a steering angle of the equipped vehicle while the equipped vehicle is being driven forwardly and towing the trailer, and based at least in part on vehicle parameters; and
   calibrating the trailer angle detection system of the equipped vehicle responsive to determination, via processing by said processor of image data captured by at least some of said cameras, that the portion of the trailer is not where said system expects it to be when the equipped vehicle is traveling straight forward.

16. The dynamic calibration method of claim 15, wherein calibrating the trailer angle detection system comprises adjusting processing by said processor of image data captured by at least some of said cameras by adjusting at least one of (i) the rearward field of view of said rearward viewing camera and (ii) applying an offset correction to a determined angle of the trailer relative to the equipped vehicle.

17. The dynamic calibration method of claim 16, comprising generating an alert signal to alert the driver of a potentially hazardous situation while the equipped vehicle is towing the trailer.

18. A dynamic calibration method for calibrating a trailer angle detection system of a vehicle towing a trailer, said dynamic calibration method comprising:
   providing a plurality of cameras;
   wherein providing a plurality of cameras comprises providing a rearward viewing camera at a rear portion of a vehicle equipped with said trailer angle detection system so as to have at least a rearward field of view;
   wherein providing a plurality of cameras comprises providing a driver side camera at a driver side portion of the equipped vehicle so as to have at least a sideward and rearward field of view;
   wherein providing a plurality of cameras comprises providing a passenger side camera at a passenger side portion of the equipped vehicle so as to have at least a sideward and rearward field of view;

providing a processor that processes image data captured by said rearward viewing camera, said driver side camera and said passenger side camera;

attaching a trailer to the equipped vehicle and rearward of the equipped vehicle;

driving the equipped vehicle forward while the equipped vehicle is towing the trailer;

processing, using said processor, image data captured by at least some of said cameras while the equipped vehicle is being driven forwardly and towing the trailer;

determining a location of a portion of the trailer via processing by said processor of image data captured by at least some of said cameras while the equipped vehicle is being driven forwardly and towing the trailer;

responsive at least in part to processing by said processor of image data captured by at least some of said cameras while the equipped vehicle is being driven forwardly and towing the trailer, determining a plurality of trailer parameters and vehicle-trailer interface parameters;

wherein the determined trailer parameters and vehicle-trailer interface parameters include at least one of (i) a distance between a rear bumper of the equipped vehicle and a tow ball of the equipped vehicle at which the trailer is attached, (ii) a distance between a tow ball of the equipped vehicle at which the trailer is attached and an axle of the trailer, (iii) a distance between a tow ball of the equipped vehicle at which the trailer is attached and a portion of the trailer, and (iv) a distance between a portion of the trailer and a longitudinal axis of the trailer;

wherein determining the plurality of trailer parameters and vehicle-trailer interface parameters is performed while the vehicle is being driven forwardly and towing the trailer;

processing by said processor of image data captured by at least some of said cameras to determine a determined trailer angle of the trailer relative to a longitudinal axis of the equipped vehicle while the equipped vehicle is being driven forwardly and towing the trailer;

determining, via processing by said processor of image data captured by at least some of said cameras, the location of the portion of the trailer relative to the equipped vehicle while the equipped vehicle is being driven forwardly and towing the trailer;

determining the determined trailer angle of the trailer at least responsive to the determined location of the portion of the trailer and while the equipped vehicle is being driven forwardly and towing the trailer; and calibrating the trailer angle detection system of the equipped vehicle responsive to determination, via processing by said processor of image data captured by at least some of said cameras, that the portion of the trailer is not where said system expects it to be when the equipped vehicle is traveling straight forward.

19. The dynamic calibration method of claim 18, wherein calibrating the trailer angle detection system comprises adjusting processing by said processor of image data captured by at least some of said cameras by adjusting at least one of (i) the rearward field of view of said rearward viewing camera and (ii) applying an offset correction to a determined angle of the trailer relative to the equipped vehicle.

20. The dynamic calibration method of claim 18, comprising:

calculating a calculated trailer angle based at least in part on calculations involving the determined parameters and a steering angle of the equipped vehicle while the equipped vehicle is being driven forwardly and towing the trailer, determining a degree of offset between the calculated trailer angle and the determined trailer angle while the equipped vehicle is being driven forwardly and towing the trailer, and calibrating the trailer angle detection system when the determined offset is greater than a threshold level.

21. The dynamic calibration method of claim 20, wherein the trailer angle detection system is calibrated via at least one of (i) adjusting image data processing by said processor, (ii) adjusting the rearward field of view of said rearward viewing camera and (iii) applying an offset correction to the determined trailer angle.

* * * * *

UNITED STATES PATENT AND TRADEMARK OFFICE
CERTIFICATE OF CORRECTION

PATENT NO. : 9,802,542 B2  
APPLICATION NO. : 15/268941  
DATED : October 31, 2017  
INVENTOR(S) : Yuesheng Lu et al.

Page 1 of 1

It is certified that error appears in the above-identified patent and that said Letters Patent is hereby corrected as shown below:

In the Specification

Column 6
Line 8, "((p)," should be --(φ),--

Signed and Sealed this
Thirteenth Day of November, 2018

Andrei Iancu
*Director of the United States Patent and Trademark Office*